US012562025B2

(12) United States Patent
Nelson et al.

(10) Patent No.: US 12,562,025 B2
(45) Date of Patent: Feb. 24, 2026

(54) SELECTIVE STORAGE OF HISTORIC EVENT DATA IN A GAME STREAMING ENVIRONMENT

(71) Applicant: IGT, Las Vegas, NV (US)

(72) Inventors: Dwayne R. Nelson, Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 314 days.

(21) Appl. No.: 18/187,411

(22) Filed: Mar. 21, 2023

(65) Prior Publication Data

US 2024/0321045 A1 Sep. 26, 2024

(51) Int. Cl.
*G07F 17/00* (2006.01)
*G07F 17/32* (2006.01)

(52) U.S. Cl.
CPC .................................. *G07F 17/323* (2013.01)

(58) Field of Classification Search
None
See application file for complete search history.

(56) References Cited

U.S. PATENT DOCUMENTS 5,957,776 A * 9/1999 Hoehne ................... G07F 17/32 273/148 R
6,863,608 B1 * 3/2005 LeMay ............... G07F 17/3255 463/20
7,156,741 B2 1/2007 Hornik et al.
7,384,339 B2 6/2008 Lemay et al.
7,980,948 B2 7/2011 Rowe et al.
8,062,127 B2 11/2011 Filipour et al.
8,122,094 B1 * 2/2012 Kotab .............. H04N 21/47214 725/87
8,206,215 B2 6/2012 Moyle et al.
8,262,468 B1 9/2012 Vanbragt et al.
8,690,684 B2 4/2014 Vanbragt et al.
8,727,892 B1 * 5/2014 Chun .................. G07F 17/3225 463/40
9,401,065 B2 7/2016 Lemay et al.
9,466,173 B2 10/2016 Nelson et al.
9,542,799 B2 1/2017 Washington et al.
9,597,586 B1 3/2017 Wiklem et al.
9,604,132 B1 3/2017 Wiklem et al.
9,715,789 B1 7/2017 Kane et al.
9,773,099 B2 9/2017 Odom et al.
9,940,781 B2 4/2018 Saravanan et al.
9,998,432 B2 * 6/2018 Dupray ................. H04L 9/0833
10,105,596 B1 10/2018 Mann
10,937,271 B2 3/2021 Malek
10,950,081 B2 3/2021 Baker et al.
10,984,633 B2 4/2021 Malek
11,080,967 B2 8/2021 Higgins et al.
11,087,584 B2 8/2021 Nelson et al.
11,145,168 B2 10/2021 Filipour, Jr. et al.
11,302,150 B2 4/2022 Nelson et al.
2002/0094869 A1 * 7/2002 Harkham ................ G07F 17/32 463/42

(Continued)

*Primary Examiner* — Paul A D'Agostino
(74) *Attorney, Agent, or Firm* — Neal, Gerber & Eisenberg LLP

(57) ABSTRACT

Systems and methods that enable a live streaming platform to selectively store game data associated with a wagering game streamed from a streaming device operating with the live streaming platform and wagered on by a client device operating with the live streaming platform.

18 Claims, 16 Drawing Sheets

(56) References Cited

U.S. PATENT DOCUMENTS

2003/0100375 A1 5/2003 Wakae et al.
2003/0125109 A1* 7/2003 Green .................. G07F 17/3241 463/29
2003/0148807 A1* 8/2003 Acres .................. G07F 17/3255 463/26
2004/0106449 A1* 6/2004 Walker ................ G07F 17/3227 463/25
2005/0187020 A1* 8/2005 Amaitis .................. G07F 17/32 463/42
2006/0247022 A1* 11/2006 Greiner ............... G07F 17/3288 463/25
2007/0202941 A1* 8/2007 Miltenberger ...... G07F 17/3225 463/25
2008/0058049 A1 3/2008 Lutnick et al.
2008/0102956 A1* 5/2008 Burman ............. G06Q 20/3224 463/42
2008/0102957 A1* 5/2008 Burman .............. G07F 17/3227 463/42
2008/0146344 A1 6/2008 Rowe et al.
2008/0274798 A1* 11/2008 Walker ................ G07F 17/3237 463/43
2009/0005165 A1* 1/2009 Arezina .............. G07F 17/3244 463/37
2009/0325686 A1 12/2009 Davis et al.
2010/0234105 A1* 9/2010 Gagner ................... G07F 17/32 463/43
2010/0255902 A1* 10/2010 Goldstein ........... G07F 17/3241 463/30
2011/0028203 A1* 2/2011 Agarwal ............. G07F 17/3286 463/43
2012/0094737 A1* 4/2012 Barclay ................... G07F 17/34 463/43
2012/0277005 A1* 11/2012 Blackburn ............ G07F 17/323 463/43
2013/0084991 A1* 4/2013 LeMay ............... G07F 17/3206 463/42
2013/0196777 A1* 8/2013 Hill ........................... A63F 3/08 463/42
2013/0281188 A1* 10/2013 Guinn ................... G07F 17/323 463/25
2014/0094277 A1* 4/2014 Guinn ................. G07F 17/3281 463/25
2014/0274359 A1 9/2014 Helava et al.
2015/0072786 A1 3/2015 Perry et al.
2015/0310698 A1* 10/2015 Polis ..................... G07F 17/323 463/20
2015/0335999 A1 11/2015 Shimizu et al.
2016/0166939 A9* 6/2016 Chudley ................. G06F 30/20 463/31
2016/0351008 A1* 12/2016 Walker .................... A63F 1/067
2017/0006322 A1 1/2017 Dury et al.
2017/0266549 A1* 9/2017 Paradise ................. A63F 13/53
2017/0316647 A1* 11/2017 Ellis .................... G07F 17/3244
2017/0358176 A1* 12/2017 Carpenter ........... G07F 17/3276
2018/0089961 A1 3/2018 Filipour, Jr. et al.
2018/0190077 A1* 7/2018 Hall .................... G07F 17/3269
2018/0211485 A1* 7/2018 George ............... G07F 17/3216
2018/0311568 A1* 11/2018 Katz ..................... G07F 17/323
2019/0122492 A1* 4/2019 Nguyen .............. G07F 17/3241
2019/0147703 A1 5/2019 Malek
2019/0244483 A1 8/2019 Collins
2019/0304249 A1 10/2019 Malek
2020/0043293 A1 2/2020 Nelson et al.
2020/0066093 A1 2/2020 Schwartz
2020/0184776 A1 6/2020 Higgins et al.
2020/0265685 A1 8/2020 Nelson et al.
2020/0294363 A1* 9/2020 Amaitis .............. G07F 17/3223
2020/0302734 A1* 9/2020 Baker ................ G07F 17/3211
2020/0364988 A1* 11/2020 Nelson ................ G07F 17/3288
2020/0402357 A1* 12/2020 Moore ................ G07F 17/3241
2021/0019994 A1* 1/2021 Drennan ............. G07F 17/3293
2021/0134114 A1* 5/2021 Wingate .............. G07F 17/3225
2021/0134383 A1* 5/2021 Choi .................. G11C 29/4401
2021/0201622 A1* 7/2021 Baker ................ G07F 17/3223
2021/0241583 A1 8/2021 Malek
2021/0264735 A1* 8/2021 Joao .................... G07F 17/3241
2021/0360215 A1* 11/2021 Hofmann ................. H04N 9/79
2022/0084368 A1* 3/2022 Merati ................ G07F 17/3223
2022/0092916 A1* 3/2022 Huke .................. G07F 17/3288
2022/0210336 A1* 6/2022 Bayer ..................... H04N 21/40
2022/0370900 A1* 11/2022 Amaitis .............. G07F 17/3223
2022/0387897 A1 12/2022 Gunn et al.
2024/0338997 A1* 10/2024 Nelson ................ G07F 17/3288
2025/0148862 A1* 5/2025 Nelson ................ G07F 17/3244

* cited by examiner

SELECTIVE STORAGE OF HISTORIC EVENT DATA IN A GAME STREAMING ENVIRONMENT

CROSS-REFERENCE TO RELATED APPLICATION

This application is related to the following commonly owned co-pending patent application: U.S. application Ser. No. 18/187,267, entitled "ACCESS TO HISTORIC EVENTS IN A GAME STREAMING ENVIRONMENT".

BACKGROUND

In various embodiments, the systems and methods of the present disclosure enable a live streaming platform to selectively store game data associated with a wagering game streamed from a streaming device operating with the live streaming platform and wagered on by a client device operating with the live streaming platform.

Gaming machines may provide users awards in primary games. Gaming machines generally require the user to place a wager to activate the primary game. The award may be based on the user obtaining a winning symbol or symbol combination and on the amount of the wager.

BRIEF SUMMARY

In certain embodiments, the present disclosure relates to a live streaming platform server including a processor, and a memory device that stores a plurality of instructions. When executed by the processor, the instructions cause the processor to receive, from a streaming device, data associated with a play of a wagering game being displayed in association with the streaming device, and communicate, to a client device and at least partially based on the data communicated from the streaming device, a live stream including at least the play of the wagering game being displayed in association with the streaming device. In these embodiments, when executed by the processor responsive to a receipt of data associated with a wager being placed on the play of the wagering game from the client device, the instructions cause the processor to cause data associated with the client device wagering on the play of the wagering game to be stored.

In certain embodiments, the present disclosure relates to a live streaming platform server including a processor, and a memory device that stores a plurality of instructions. When executed by the processor, the instructions cause the processor to receive, from a streaming device, data associated with a play of a wagering game being displayed in association with the streaming device, and communicate, to a plurality of client devices and at least partially based on the data communicated from the streaming device, a live stream. When executed by the processor responsive to a receipt of data associated with a wager being placed on the play of the wagering game from a first client device of the plurality of client device, the instructions cause the processor to cause data associated with the play of the wagering game displayed by the first client device to be stored. When executed by the processor responsive to no data being received in association with any wager being placed on the play of the wagering game by a second, different client device of the plurality of client device, the instructions cause the processor to cause no data associated with the play of the wagering game displayed by the second, different client device to be stored.

In certain embodiments, the present disclosure relates to a method of operating a live streaming platform server. The method includes receiving, from a streaming device, data associated with a play of a wagering game being displayed in association with the streaming device, and communicating, to a client device and at least partially based on the data communicated from the streaming device, a live stream including at least the play of the wagering game being displayed in association with the streaming device. Responsive to a receipt of data associated with a wager being placed on the play of the wagering game from the client device, the method includes causing, by a processor, data associated with the client device wagering on the play of the wagering game to be stored.

Additional features are described herein, and will be apparent from the following Detailed Description and the figures.

DETAILED DESCRIPTION

Figure 1A:
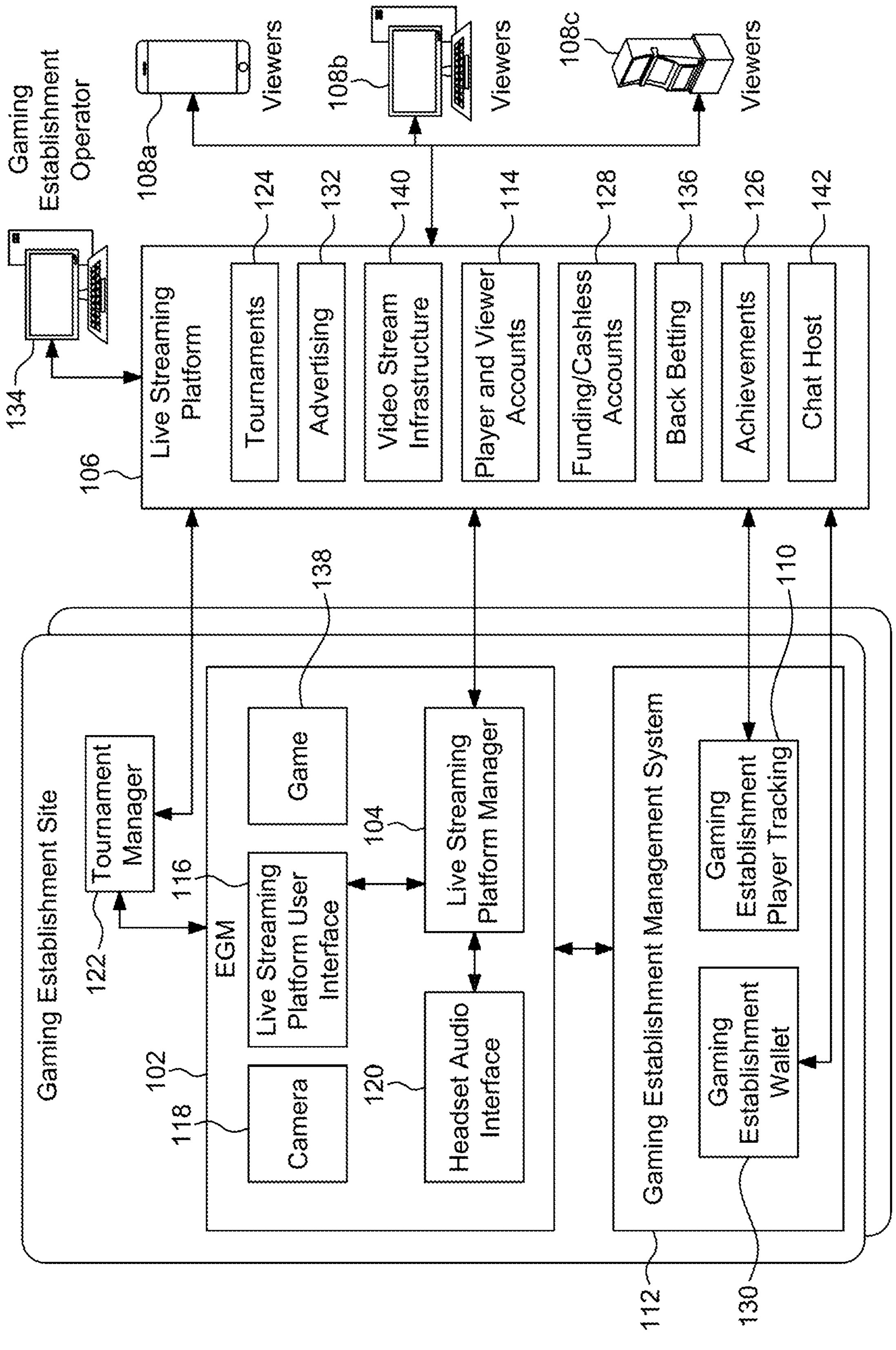
FIG. 1A is an example configuration of an architecture of a plurality of different components of the system of the present disclosure.

In various embodiments, the systems and methods of the present disclosure enable a live streaming platform to selectively store game data associated with a wagering game streamed from a streaming device operating with the live streaming platform and wagered on by a client device operating with the live streaming platform.

In certain embodiments, the systems of the present disclosure enable a user of a client device the opportunity to wager on plays of games occurring at a streaming device and/or enable the user of the client device to interact with a user of the streaming device. In these embodiments, upon a recollection event occurring in association with the user of the client device, the user of the streaming device and/or an operator of the live streaming platform, the system recalls certain information associated with zero, one or more events that occurred (or did not occur) in the streaming environment. The system then enables the user of the client device, the user of the streaming device and/or the operator of the live streaming platform access to such recalled information.

In certain embodiments, the recollection event occurs responsive to one or more inputs made by a requestor (e.g., the user of the client device, the user of the streaming device and/or the operator of the live streaming platform) in association with one or more questions pertaining to one or more events that occurred (or did not occur) in the streaming environment. In these embodiments, following the occurrence of the recollection event and, in certain embodiments, a determination that the requester is authorized to access certain historical information, the system causes the display of relevant historical information to potentially answer the questions asked. In certain such embodiments, the type of historical information provided, the amount of historical information provided, the format of the historical information provided and/or whom the historical information is provided to, is based on the questions asked. For example, following an operator of the live streaming platform requesting to view historical game outcomes from streamed wagering games displayed to a user of a client device, the system accesses such historical game outcomes and displays a listing of the different historical game outcomes displayed to the user of the client device. In this example, if the operator of the live streaming platform requests additional information on one or more of the historical game outcomes (i.e., the operator asks one or more follow-up questions), the system displays one or more images and/or videos of the one or more historical game outcomes to the operator. Such a configuration provides a streamlined interface for a user of a client device, a user of a streaming device and/or an operator of a live streaming platform to access information pertaining to events that may (or may not) have occurred in the streaming environment.

In certain embodiments, the recollection event additionally or alternatively occurs in association with a dispute undertaken by the user of the client device, such as a dispute pertaining to an award from a wagered on play of a game streamed from the streaming device and displayed at the client device. In these embodiments, following the occurrence of the recollection event and, in certain embodiments, a determination that the user of the client device is authorized to access certain historical information, the system causes the display of relevant historical information to resolve the dispute undertaken. In certain such embodiments, the system displays such relevant historical information to the user of the client device as well as one or more additional parties, such as the operator of the live streaming platform and/or the user of the streaming device, tasked with attempting to resolve the dispute. For example, following a user of a client device requesting to view a historical game outcome of a wagering game streamed from a streaming device and the user of the client device making an additional input to dispute the lack of an award won from that historical game outcome, the system retrieves historical information evidencing that the user of the client device did not place a wager on that particular wagering game streamed from the streaming device. In this example, by enabling the user of the client device access to the retrieved historical information, the system automatically resolves the dispute. (or otherwise prepares a package of relevant historical information for further review). Such a configuration enables different parties to efficiently resolve a dispute without the need to dedicate additional resources beyond the data already utilized by the live streaming platform.

In various embodiments, the present disclosure is directed to a system including various components and/or sub-systems that operate individually and/or collectively to enable a first user to participate in a live stream of their gaming experience and potentially reap certain benefits (in the form of awards, notoriety and interactions with other users) associated with such participation. In various such embodiments, the various components and/or sub-systems operate individually and/or collectively to capture live stream data and upload the captured live stream data. The various components and/or sub-systems additionally or alternatively operate individually and/or collectively to enable one or more second users to view and/or interact with the captured live stream and/or a modification of the captured live stream to also potentially reap certain benefits (in the form of awards, notoriety and interactions with other users).

In various embodiments, the live streaming system of the present disclosure employs a streaming device, such as a streaming electronic gaming machine or a streaming personal gaming device, that enables a first user (e.g., a streamer or influencer at a streaming device) to participate in one or more gaming sessions. In these embodiments, the live streaming system of the present disclosure further employs a client device, such as viewing electronic gaming machine or a viewing personal gaming device, that enables a second user (e.g., a viewer or follower at a client device) to view, interact with and/or participate in the one or more gaming sessions occurring at the streaming device. In such embodiments, the streaming device communicates data associated with the gaming sessions and/or data associated with the first user which is independent of the gaming sessions to one or more components of a live streaming platform. The one or more components of the live streaming platform utilize the communicated data to offer various features and functions to the second users at the client devices.

In certain embodiments, the streaming device and/or the client device comprises an electronic gaming machine ("EGM") including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities). In certain such embodiments, the EGM operating as the streaming device interacts with the live streaming platform to facilitate the live streaming system of the present disclosure as well as foster any interactions between a user of the EGM and/or one or more viewers. In these embodiments, the EGM communicates data regarding one or more aspects of a gaming session to one or more components of the live streaming platform which operate to publish content to zero, one or more client devices. For example, as seen in FIG. 1A, the system employs an EGM 102 as a streaming device that includes or is otherwise associated with a live streaming platform manager 104 that interacts with the live streaming platform 106 to enable a live stream of one or more events occurring in association with the streaming EGM and/or interactions between the streaming EGM and one or more client devices 108*a*, 108*b*, 108*c*.

Figure 1B:
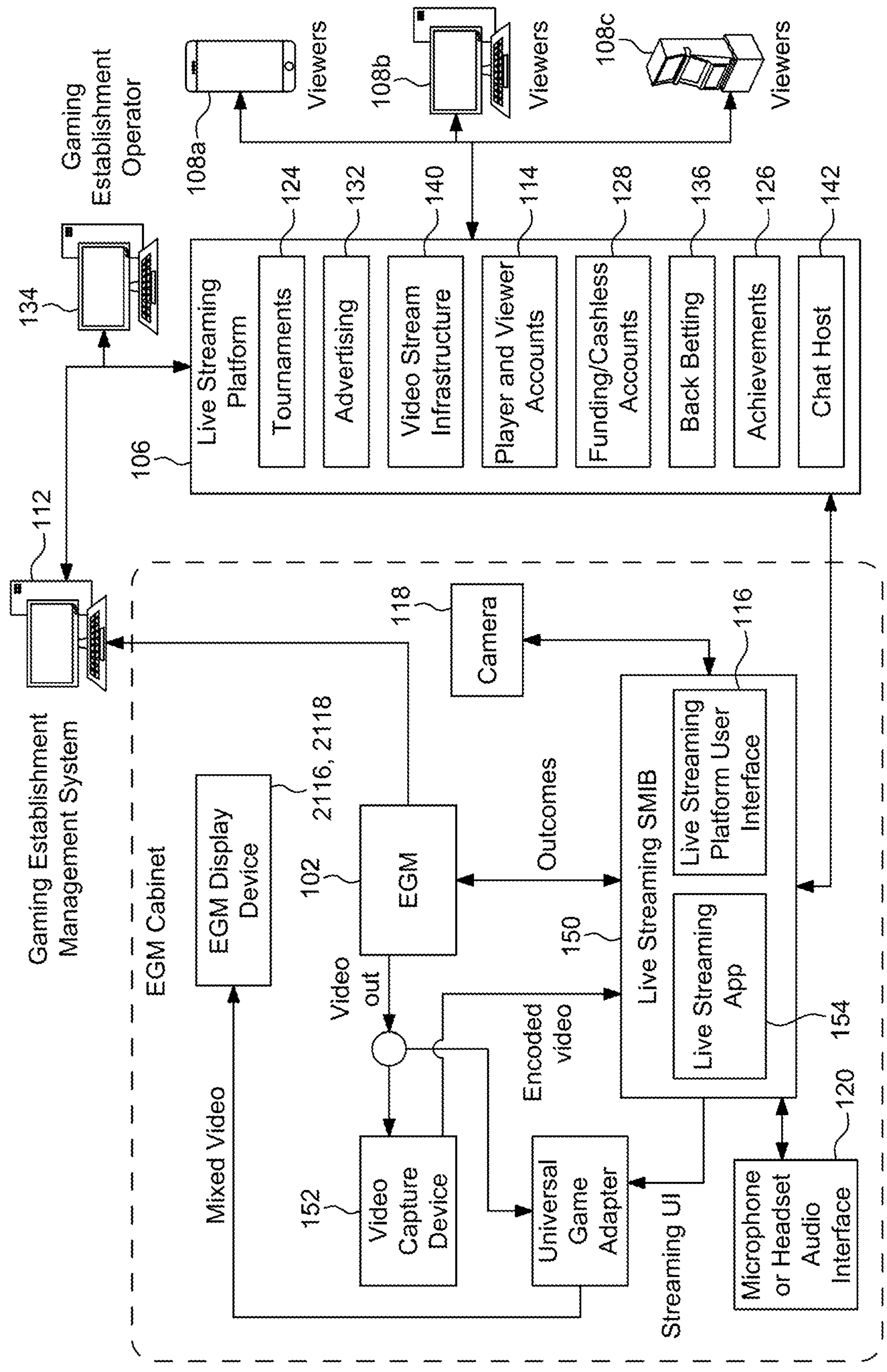
FIG. 1B is an example configuration of another architecture of a plurality of different components of the system of the present disclosure.

In certain embodiments, the streaming device and/or the client device comprises a component of a gaming establishment management system in communication with an EGM, such as a slot machine interface board ("SMIB") in communication with an EGM. In certain additional or alternative embodiments, the streaming device and/or the client device comprises a component, such as a SMIB, that is in communication with an EGM and that operates independent of a gaming establishment management system. In certain such embodiments, the device operating as the streaming device interacts with the live streaming platform to facilitate the live streaming system of the present disclosure as well as foster any interactions between a user of the EGM and/or one or more viewers. In these embodiments, the device operating as the streaming device receives data from the EGM regarding one or more aspects of a gaming session of the EGM, and communicates part or all of such data to one or more components of the live streaming platform which operate to publish content to zero, one or more client devices. For example, as seen in FIG. 1B, the system employs a streaming SMIB 150 which operates with an EGM 102 to capture data associated with the EGM and interact with the live streaming platform 106 to enable a live stream of one or more events occurring in association with the EGM and/or interactions between the streaming SMIB (and/or associated EGM) and one or more client devices 108*a*, 108*b*, 108*c*.

Figure 1C:
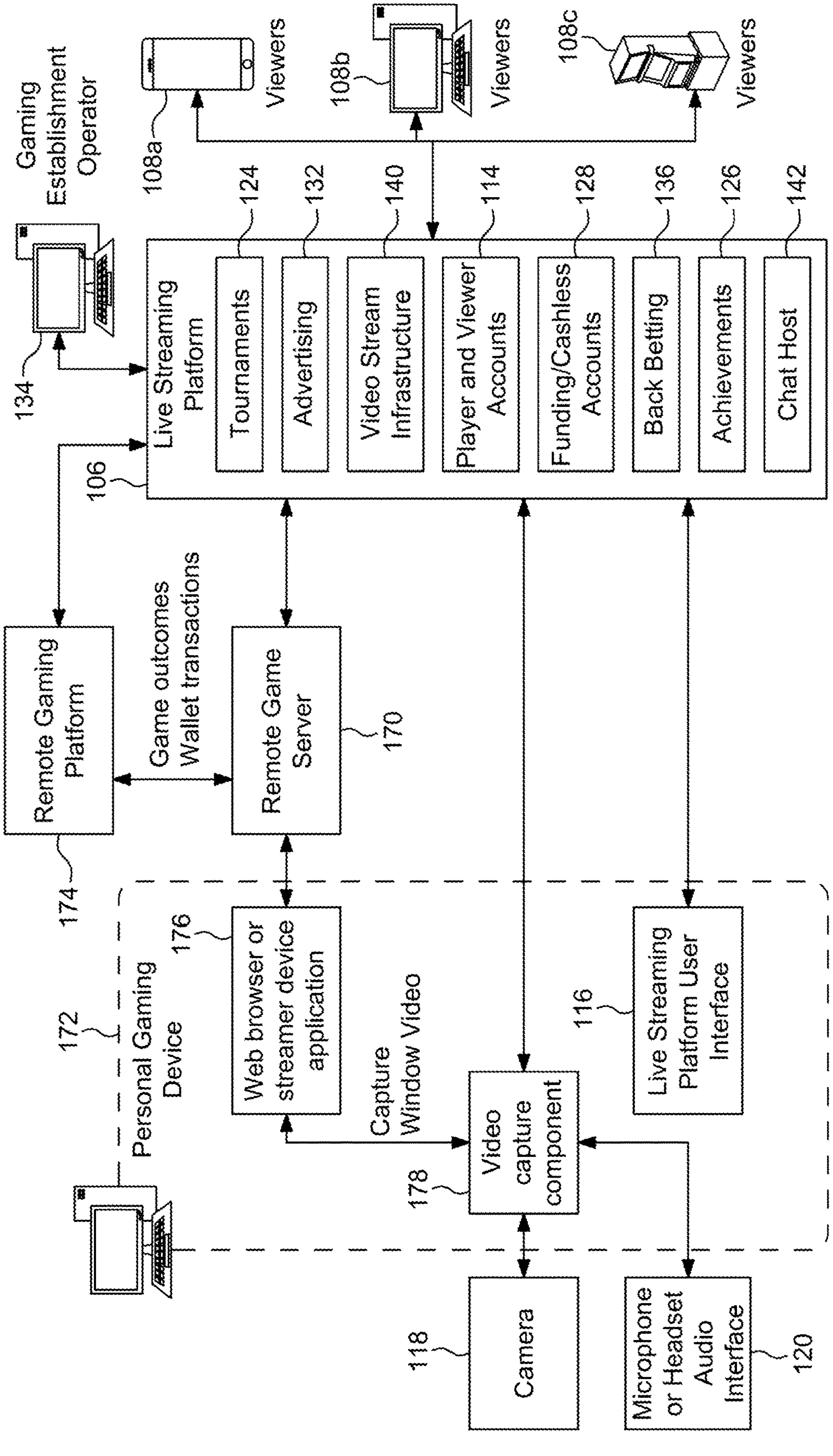
FIG. 1C is an example configuration of another architecture of a plurality of different components of the system of the present disclosure.

In certain embodiments, the streaming device and/or the client device comprises a personal gaming device. In certain such embodiments in which the personal gaming device operates as the streaming device, the personal gaming device operates with a remote game server to offer one or more plays of one or more games independent of any EGM and any SMIB associated with the EGM. In certain such embodiments, the personal gaming device and/or remote game server interacts with the live streaming platform to facilitate the live streaming system of the present disclosure as well as foster any interactions between a user of the personal gaming device and/or one or more viewers. In these embodiments, the personal gaming device and/or remote game server communicate data regarding one or more aspects of a gaming session to one or more components of the live streaming platform which operate to publish content to zero, one or more client devices. For example, as seen in FIG. 1C, the system employs a remote game server 170 that operates with a personal gaming device 172, such as a mobile device or a personal computer, and a remote gaming platform 174 (which interacts with the live streaming platform 106) to enable, via an internet browser or application 176 of the personal gaming device, a live stream of one or more events occurring in association with the personal gaming device 172, one or more events occurring in association with the remote game server 170 and/or one or more interactions between the personal gaming device 172 and one or more client devices 108*a*, 108*b*, 108*c*.

In certain embodiments, upon an occurrence of a user identification event, the system enables a user at a streaming device to log into a live streaming platform account associated with the user. In different embodiments, the user logs into a live streaming platform account via one or more of: the user inserting a live streaming platform identification card (that has an encoded user identification number that uniquely identifies the user) into a card reader of the streaming device; the user inserting a player tracking card that functions as a live streaming platform identification card (that has an encoded user identification number that uniquely identifies the user) into a card reader of a streaming device; an establishment of a wireless communication link between the streaming device and a mobile device executing an application associated with an identified user; the utilization of any suitable biometric technology or ticket technology to identify a user associated with a gaming session occurring at a streaming device. In certain embodiments, with reference to FIG. 1A, wherein the system includes or is otherwise in communication with a gaming establishment player tracking system 110 of a gaming establishment management system 112, the user identification occurs in association with a user logging into the player tracking system from an EGM 102. In this embodiment, the EGM communicates the user identification data to one or more components of the live streaming platform 106 (e.g., a server of the live streaming platform) which log the user into a live streaming account 114 associated with the user and maintained in association with the live streaming platform. In certain embodiments wherein the system is separate from and not in communication with a gaming establishment player tracking system, the user identification occurs in association with a user logging into the live streaming platform from the streaming device (such as by the user entering an identification and password or login code at the streaming device). In this embodiment, the streaming device communicates the user identification data to one or more components of the live streaming platform which log the user into the live streaming account associated with the user.

In certain embodiments, in association with a user logging into a live streaming platform account of the live streaming platform from a streaming device, the system enables the user to enable/disable certain components of the streaming device. In certain embodiments, in association with a user logging into a live streaming platform account of the live streaming platform from a streaming device, the system enables the user to modify the settings or parameters of certain components of the streaming device. In these embodiments, as seen in FIGS. 1A to 1C, as part of configuring the streaming device to operate with the live streaming platform, the system utilizes a live streaming platform user interface 116 to enable a user to modify zero, one or more aspects of the streaming device as they relate to how the streaming device operates with the live streaming platform.

In one such embodiment, the system enables the user to modify the use of one or more display devices of the streaming device and/or one or more display devices separate from, but associated with, the streaming device. For example, the system enables the user to enable or disable one or more display devices of the streaming device from displaying the images captured by the streaming device which are displayed to the viewers. In another example, the system additionally or alternatively enables the user to modify the settings of the display device(s) of the streaming device, such as modifying the screen layout of the streaming device by selecting an arca of the display device to display the live stream displayed to the viewers, or modifying whether to utilize a split screen to display the live stream displayed to the remote users.

In another such embodiment, the system enables the user to modify the use of one or more cameras of the streaming device and/or one or more cameras separate from, but associated with, the streaming device. For example, as seen in FIGS. 1A to 1C, since one or more cameras 118 of the streaming device may be used to capture data of the user playing the streaming device, the system enables the user to enable or disable the camera(s) of the streaming device from capturing one or more images of the user playing the streaming device. In another example, the system additionally or alternatively enables the user to modify the settings of the camera(s) of the streaming device, such as modifying the resolution of the camera, modifying the color settings of the camera (e.g., to capture images in color or black and white), modifying the use of a green screen.

In another such embodiment, the system enables the user to modify the use of one or more sound generating devices, such as speakers, of the streaming device and/or one or more sound generating devices separate from, but associated with, the streaming device. For example, since one or more speakers of the streaming device may be used to generate sounds communicated from one or more viewers at one or more client devices, such as comments made by one or more viewers, the system enables the user to enable or disable the speaker(s) of the streaming device. In another example, the system additionally or alternatively enables the user to modify the settings of the speaker(s) of the streaming device, such as modifying the volume of the speakers.

In another such embodiment, the system enables the user to modify the use of one or more sound capture devices, such as microphones, of the streaming device and/or one or more sound capture devices separate from, but associated with, the streaming device. For example, since one or more microphones of the streaming device may be used to capture the sounds at the streaming device, such as comments made by the user, the system enables the user to enable or disable the microphone(s) of the streaming device. In another example, the system additionally or alternatively enables the user to modify the settings of the microphone(s) of the streaming device, such as modifying the sensitivity of the microphone(s).

In another embodiment, in addition to or alternatively from modifying the settings of one or more components of the streaming device and/or components separate from, but associated with, the streaming device, the system enables a user to connect or otherwise pair a peripheral device with the streaming device and utilize the connected peripheral device in association with the capturing of data for the live stream. That is, the system of this embodiment enables the user to connect one or more peripherals to the streaming device to further enhance the broadcasting experience.

In one embodiment, the peripheral device includes a mobile device (with or without a camera) wherein the system enables a user to wirelessly connect or otherwise pair the mobile device to the streaming device such that the user can interact with their audience of viewers using the mobile device. In one such embodiment, the wireless communication link includes a direct pairing such that when the user of the mobile device is currently located at or otherwise engaging with a streaming device, a direct pairing or linkage occurs between the mobile device and the streaming device utilizing one or more wireless communication protocols, such as Bluetooth™ signals, Bluetooth™ Low Energy ("BLE") signals, one or more cellular communication standard (e.g., 3G, 4G, 5G, 6G, LTE) signals, one or more Wi-Fi compatible standard signals and/or one or more short range communication signals, such as near field communication ("NFC") signals protocol). In another such embodiment, the wireless communication link includes an indirect pairing such that when the user of the mobile device is currently located at or otherwise engaging with a streaming device and wirelessly connected to one or more servers, such as servers of a gaming establishment, an indirect pairing or linkage occurs between the mobile device and the streaming device via the one or more servers. In another embodiment, in addition to or alternative from using the mobile device as a peripheral device associated with the streaming device, the system enables the user to utilize a paired mobile device (which is running a mobile device application configured to interface with the streaming device) to display a live streaming platform user interface such that the user can adjust one or more settings on the streaming device which pertain to the live stream.

In another embodiment, the peripheral device includes a headset (including a microphone) wherein the system enables a user to connect or otherwise pair the headset (e.g., headset audio interface 120 of FIGS. 1A to 1C) to the streaming device such that the user can speak with their audience of viewers at client devices. In this example, if the headset is a wired headset, the system enables the user to connect to the streaming device over USB Audio, standard analog headphone and speaker jacks, or optical inputs and outputs. On the other hand, if the headset is a wireless headset, the system enables the user to connect to the streaming device via establishing a wireless communication link with the headset. In these embodiments, if the peripheral device requires a power source, the system further enables the user to power such connected peripheral devices via one or more USB power outlets and/or wireless charging devices.

In certain embodiments, in addition to enabling a user to connect a peripheral device to the streaming device, the system adjusts one or more settings of the streaming device responsive to the detection of a connected peripheral device. For example, upon the streaming device detecting that headphones are connected, the system mutes one or more speakers of the streaming device and routes one or more sound outputs to the headphones so that the risk of echo when the user is speaking into their headphone microphone is minimized. In one such example, the system routes all sound outputs to the headphones. In another such example, the system routes certain sound outputs to the headphones but continues routing other sound outputs, such as sounds associated with large jackpots, sounds occurring during certain in-game bonuses, or other sounds that contribute to the general ambiance of the gaming establishment for exciting events, to the speakers of the streaming device.

It should be appreciated that while certain adjustments to one or more components of the streaming device occur in association with a user logging into a live streaming platform account of the live streaming platform, in certain additional embodiments, one or more adjustments to one or more components of the streaming device occur based on the live stream of the user's gaming session. In these embodiments, the streaming device displays (either continuously or responsive to one or more inputs made by the user during the user's gaming session) one or more live streaming platform user interfaces which enable the user to change one or more configurations of the streaming device that pertain to the broadcasted live stream of the user's gaming session. For example, since one or more display devices of the streaming device and/or speakers of the streaming device may be utilized to provide the user the live stream which is broadcasted to one or more viewers at client devices, the system gives the user of the streaming device instant feedback and enables the user to modify one or more settings of any suitable component utilized to produce the live stream, such as a camera of the streaming device, a camera paired with the streaming device, a microphone of the streaming device or a microphone paired with the streaming device.

In another embodiment, in addition to or alternatively from adjusting one or more settings of the streaming device based on the feedback of the user, the system displays to the user certain information regarding the user's live stream to provide the user at the streaming device a more immersive experience to foster more interaction with the viewers at the client devices. For example, the streaming device utilizes a user feedback display to display to the user statistics about how many viewers are viewing the user's play online at the current point in time. In another example, the streaming device utilizes a user feedback display to inform the user at the streaming device of the current live chat associated with the user's gaming session so that the user can respond (using a microphone to provide comments and/or answer requests from viewers). In another example, the streaming device utilizes a user feedback display to display non-game play statistics for the play session, such as total gifts given, gifts given to charity, or any award given to the user by viewers. In different embodiments, the system displays none, part or all of the information of this user feedback display to the viewers of the live stream.

In certain embodiments, following the occurrence of the user identification event and any modifications to any components of (or associated with) the streaming device, one or more components of the system of the present disclosure monitor for an occurrence of a capture event that potentially results in the generation of content to be streamed to one or more viewers at one or more client devices. In these embodiments, responsive to an occurrence of a capture event, the system captures live stream data associated with the gaming session occurring at the streaming device. In certain embodiments, the live stream data comprises audio/visual content generated by the streaming device and/or captured by the streaming device. In certain embodiments, the live stream data additionally or alternatively comprises streaming device data associated with the gaming session and/or the streaming device, such as, but not limited to, meter data (e.g., money in, money out, money wagered, money won), configuration data (e.g., manufacturer, denomination, paytable data), bonusing data (e.g., progressive win, system bonus win), ticket in/ticket out data, and/or cashless fund transfer data.

In certain embodiments, the system captures the content generated by the streaming device, such as content displayed by one or more display devices of the streaming device, to broadcast to the viewers (with the possible addition of supplemental content). In another such embodiment, the system captures certain content generated by the streaming device, such as content displayed by areas or windows of one or more display devices of the streaming device, to broadcast to the viewers (with the possible addition of supplemental content). In this embodiment, rather than displaying to the viewers all the content which the user at the streaming device sees (which may include external controlled interface content personal to the user or other sensitive content not intended to be broadcasted), the system captures certain content, such as a game play content, and does not capture certain other content.

In certain embodiments, following the capture of live stream data, the system determines whether a captured data modification event has occurred. That is, after obtaining the data associated with the content generated by the streaming device which forms at least part of the live stream and prior to enabling any viewers access to that particular captured data of the live stream, the system determines whether to one or more events have occurred to augment such content by changing part of the content, removing part of the content and/or adding to the content.

If the system determines that a captured data modification event occurred, the system modifies the live stream data captured from the streaming device. In other words, upon an occurrence of a modification event and prior to enabling any viewers access to that particular captured data of the live stream, the system modifies or otherwise alters the data captured from the streaming device to supplement the live stream with additional information. In various embodiments, supplemental content derived from this additional information is added to the live stream by overlaying the supplemental content onto a captured frame of a display device of the streaming device and/or separately displaying the supplemental content along with a captured frame of a display device of the streaming device such that the live stream includes audio-visual content of the user's gaming session as well as the additional information.

In certain embodiments, the additional information utilized to form the supplemental content added to the live stream includes one or more of: still images (e.g., a photograph of a user's reaction during a play of a game), video clips (e.g., a video of a user's reaction to a play of a game), sound clips (e.g., a user's verbal reaction to a play of a game), augmented still images (e.g., an augmented photograph of a user's reaction during a play of the game, such as the user's reaction modified via one or more filters or superimposed with an outcome of a play of the game), augmented video clips (e.g., an augmented video recording of a user's reaction to a play of a game), augmented sound clips (e.g., a user's augmented verbal reaction to a play of a game), audio-video clips, text, non-wagering transaction information associated with the user (e.g., an amount spent purchasing goods at a gaming establishment's luxury clothing store), location information, application usage information, event attendance information, and/or biometric information. In certain embodiments, the system informs the user of the publication of this additional information. In certain of such embodiments, the system enables the user to opt-out of (or alternatively opt-into) this feature as well as enables the user to configure notifications of when such additional information is to be published. It should be appreciated that in certain instances when the client device comprises an EGM, such as an EGM located in a gaming establishment, the additional information utilized to form the supplemental content added to the live stream comprises still images, video clips, sound clips, augmented still images, augmented video clips, augmented sound clips, audio-video clips, text, location information, application usage information, event attendance information, and/or biometric information of the user of the EGM client device.

In another embodiment, the additional information utilized to form the supplemental content added to the live stream includes details about the user's current (or historical) gaming session, such as, but not limited to, a largest award amount won in the gaming session, a duration of the gaming session, an average amount wagered for the gaming session, a total amount wagered for the gaming session, a total amount won for the gaming session, an average amount won for the gaming session, and/or any jackpots won for the gaming session.

In another embodiment, the additional information utilized to form the supplemental content added to the live stream includes details about one or more tournaments the user is currently participating in (or historically participated in). In this embodiment, multiple users participate in a gaming establishment tournament where users compete to determine who will win the tournament and one or more users in the tournament stream their play live using the live streaming platform of the present disclosure. For example, the system offers a tournament to eligible viewers (e.g., viewers that pay a fee or have a relationship with the user of a streaming device) in which wagers are placed by client devices over a period of time and the client device with the largest win at the end of the period is the winner of the tournament. In such a configuration, the live streaming platform is linked to the system running the tournament and tracking the score of the streaming devices that are participating. The live streaming platform uses the data published by the tournament system, such as a tournament manager server (e.g., a component of a tournament management system 122 in communication with the streaming device of FIG. 1A), to display additional information regarding any streamed tournaments (e.g., tournaments 124 offered in association with the live streaming platform of FIGS. 1A to 1C). Such additional information includes, but is not limited to, a current leaderboard of the tournament, a current standing in the tournament (i.e., the user's current position on the leaderboard of the tournament), a largest award amount won in the tournament, a duration of the tournament, an average amount wagered in the tournament, a total amount wagered in the tournament, a total amount won in the tournament, an average amount won in the tournament, and/or any jackpots won in the tournament.

In another embodiment, the additional information utilized to form the supplemental content added to the live stream includes details about any achievements earned or otherwise associated with the user and/or the user's current (or historical) gaming session. In this embodiment, the system utilizes game outcome data published by the streaming device to the live streaming platform to associate the user of the streaming device (and/or the user of the client device) with one or more achievements such as badges, avatars, access to one or more emojis, awards (in the form of monetary credits, non-monetary credits, physical goods, and/or any award of the present disclosure). The system causes information about such achievements (e.g., achievements 126 maintained in association with the live streaming platform of FIGS. 1A to 1C) to be overlaid onto or displayed along with the captured frames. In different embodiments, such achievements are earned or otherwise associated with the user based on the historical play statistics of the user and/or the historical play statistics of the user relative to the historical play statistics of one or more other users (to determine how each user has relatively performed during one or more gaming sessions). It should be appreciated that while such achievements may be based on game outcome data of a wager amount and any awards, game outcome data may additionally be based on any trackable event occurring in association with a play of a game (e.g., for a play of poker game, the game outcome data includes the hand of playing cards initially dealt, the playing cards held by the user, the final hand of playing cards and any associated award), or occurring independent of any play of any game but otherwise associated with the user's gaming session.

In another embodiment, the additional information utilized to form the supplemental content added to the live stream includes details about a quantity of viewers currently viewing the user's gaming session. In another such embodiment, the additional information includes historical details about a quantity of historical viewers whom has viewed the user's historic gaming sessions. In another embodiment, the additional information utilized to form the supplemental content added to the live stream includes details about a quantity of views of the user's gaming session. In another such embodiment, the additional information includes historical details about a quantity of historical views of the user's historic gaming sessions. In another embodiment, the additional information utilized to form the supplemental content added to the live stream includes details about a quantity of viewers following the user (i.e., a number of followers of the user). In another embodiment, the additional information utilized to form the supplemental content added to the live stream includes details about a quantity of subscribers associated with the user.

In another embodiment, the additional information utilized to form the supplemental content added to the live stream includes details about any gifts or awards sent to the user of the streaming device by one or more viewers of one or more client devices. In this embodiment, viewers can send monetary gifts to users as a virtual "thank you" for playing well, or performing some action requested by a viewer, wherein the system displays such gifts (either individually or collectively) such that the viewers see the live stream of the user's gaming session as well as information regarding such gifts. For example, a viewer congratulates the user for earning a royal flush in a poker game by gifting them $5. In another example, a viewer requests, through an online chat, that the user hold certain cards in a poker hand by gifting the user some amount of money. In another embodiment, one or more gifts given to users participating in the tournament by viewers impact a user's position in an ongoing tournament. For example, if a user has a credit meter balance of $500 after two minutes of play, and they're currently ranked 3$^{rd}$ on the leaderboard, and an online viewer gifts that user $200, then the user may jump into 2$^{nd}$ place on the leaderboard. It should be appreciated that these gifts are funded by electronic credits that viewers establish with the live streaming platform. That is, as seen in FIG. 1A to 1C, the system of the present disclosure utilizes accounts associated with viewers 128 that are maintained by one or more components of the live streaming platform and/or one or more components independent of but associated with the live streaming platform. The system employs such accounts to transfer funds to one or more digital accounts or electronic wallets (e.g., gaming establishment account 130 of FIG. 1A) and/or to one or more components of a gaming establishment fund management system that maintain one or more gaming establishment accounts, such as cashless wagering accounts, associated with such users. In different embodiments, such funds are transferred from an account associated with the viewer to an account associated with the user, from an account associated with the viewer to a cashless wagering account maintained for the user by a cashless wagering system of a gaming establishment, and/or from an account associated with the viewer to a credit balance of the streaming device (wherein such transfers are recorded using existing wagering account transfer or bonus meters tracked by a streaming device, or view additional meters added to track such transfers). In another embodiment, such funds are transferred from an account associated with a viewer to the streaming device wherein rather than such funds directly modifying a credit balance of the streaming device, such funds contribute to one or more game outcomes determined by the streaming device (e.g., a gift of $5 from a viewer is provided to the user at the streaming device as an award of $5 associated with a game outcome determined in association with a play of a game). It should be appreciated that any suitable digital wallet or account which maintains or is otherwise associated with an amount of funds for a user at a streaming device and/or a viewer may be utilized in association with the present disclosure.

In another embodiment, the additional information utilized to form the supplemental content added to the live stream includes details about any gifts provided to any charities associated with the user of the streaming device by one or more viewers at one or more client devices. In this embodiment, viewers can send monetary gifts to a charity of the user's choosing as a virtual "thank you" for playing well, or performing some action requested by a viewer, wherein the system displays such charitable gifts (either individually or collectively) such that the viewers see the live stream of the user's gaming session as well as information regarding such gifts. For example, a viewer congratulates the user for playing for a certain amount of time by providing a gift of $50 to a charity designated by the user. It should be appreciated that the charitable gift given by a viewer is funded by transferring money from an account that viewer established with the live streaming platform to one or more financial institution accounts associated with the charity and maintained by one or more financial institutions.

In another embodiment, the additional information utilized to form the supplemental content added to the live stream includes advertising data associated with a gaming establishment wherein the streaming device is located and/or a third party. For example as seen in FIGS. 1A to 1C. the streaming device broadcasting the user's video stream operates with the live streaming platform 106 to encode an advertisement 132 for a gaming establishment in the video. For example, the gaming establishment advertisement includes an embedded audio/video clip, such as footage of the user at the streaming device or a promotional audio/video clip of a show attended by the user at a gaming establishment, along with attendance information regarding a user attending the show, the gaming establishment where the concert occurred and advertising text describing upcoming dates for the show. In these embodiments, the gaming establishment advertisement (and/or third party advertisement associated with the live stream) offers the viewers different benefits, such as awards, discounts, free points, free promotional credits at the gaming establishment for signing up for a visit to the gaming establishment, for viewing the live stream or associating the viewer's player tracking account with their viewer account. In different embodiments, different levels of activity by the viewers are associated with different benefits, wherein the benefit provided to the viewer is based on how much they watch, how many gifts they give users, or how many bets they place. In these embodiments, such benefits are funded by a gaming establishment if the gaming establishment that is hosting the user gets a percentage of the subscriptions to a user's channel, gifts, and/or bets (or a percentage of the hold associated with such bets).

In another embodiment, the additional information utilized to form the supplemental content added to the live stream includes details about an additional wager placed by the user at the streaming device. In one such embodiment, the streaming device enables users to place wagers on sporting events while at the streaming device, wherein the information regarding such sports wagers are broadcast as part of their live stream. In this embodiment, as the events associated with a sports wager made occur or finalize, the results of the sports wager are reported to the live streaming platform by the streaming device (or the sports betting system which maintains and tracks such wagers). Such reporting enables the live streaming platform to update the appropriate user statistics and possibly award the user any achievements as described above.

In certain embodiments, in addition to or alternatively from modifying the live stream data captured from the streaming device with additional information, the modification of the live stream data includes removing certain of the captured live stream data or otherwise altering the captured live stream data. In these embodiments, rather than displaying to the viewers all the content which the user at the streaming device sees (which may include external controlled interface content personal to the user or other sensitive content not intended to be broadcasted), the system obscures certain content prior to being broadcasted to any viewers. For example, if a streaming device is currently displaying a live video stream associated with a sporting event in a window of a display device of the streaming device and the live streaming platform lacks the content licenses to also display the live video stream of the sporting event, the system blacks out, grays out or otherwise masks the live video stream of the sporting event from being displayed to viewers.

It should be appreciated that in certain embodiments which enable one or more viewers of one or more client devices to interact with one or more live streams (e.g., via live chatting with a user at the streaming device generating at least part of the live stream and/or via wagering on one or more events associated with the streaming device generating at least part of the live stream), the live streaming platform accounts for this interaction in determining any additional information to display as part of the live stream. For example, the additional information incorporated as part of a live stream includes data associated with one or more bets placed in association with a user at a streaming device, such as the amount won by viewers for back betting on a user at a streaming device or the win and loss records for back betting sports wagers placed by viewers in association with a user at a streaming device. In such embodiments wherein one or more viewers interact with the live stream, since the streaming device is the entity that encodes the video stream, any activities or event occurring on the live streaming platform must be sent to the streaming device to update any graphical elements rendered in the video stream. For example, if a viewer sends a gift to a user at the streaming device, then the live streaming platform generates an award message. In this example, either the live streaming platform sends the generated message to the streaming device, or the streaming device actively polls the live streaming platform for any outstanding notification messages. Upon receipt of a notification message, the streaming device acts upon the notification, such as displaying a notification that only the user at the streaming device can see, rendering of one or more notifications onto the game itself, and/or rendering of one or more notifications as part of the video stream (which are viewable by viewers and may or may not be seen by the user at the streaming device).

Following the modification of the data captured from the streaming device or if the system determines that a captured data modification event did not occur, the system uploads the live stream data to the live streaming platform. In certain embodiments, the uploaded live stream data comprises unmodified captured live stream data (e.g., unmodified audio/visual content generated by the streaming device and/or content captured by the streaming device). In certain additional or alternative embodiments, the uploaded live stream data comprises modified captured live stream data (e.g., modified audio/visual content generated by the streaming device and/or modified content captured by the streaming device). In certain additional or alternative embodiments, the uploaded live stream data comprises streaming device data associated with the gaming session and/or the streaming device. In one example in which the streaming device is an EGM, as seen in FIG. 1A, the live streaming platform manager 104 associated with the EGM uploads certain of the live stream data to a video stream infrastructure component 140 of the live streaming platform 106.

In another example in which the streaming device is a SMIB associated with an EGM, as seen in FIG. 1B, a live streaming application 154 being executed by the SMIB uploads certain of the live stream data to the video stream infrastructure component 140 of the live streaming platform 106. In certain embodiments in which the streaming device comprises a component of a gaming establishment management system, such as a SMIB associated with an EGM, to enable the streaming SMIB to capture live stream data from the EGM and communicate the live stream data to one or more components of the live streaming platform, the streaming SMIB comprises various hardware and/or software interfaces. In certain embodiments, the streaming SMIB includes zero, one or more video inputs with hardware interfaces (e.g., HDMI, DVI, VGA or Ethernet), zero, one or more audio inputs (e.g., 3.5 mm analog input or a fiber optic input) and zero, one or more communication interfaces (e.g., serial, Ethernet, fiber or wireless) with the EGM. In certain embodiments, the streaming SMIB includes zero, one or more connections to one or more servers of the live streaming platform and/or one or more servers of the gaming establishment management system. In these embodiments, as seen in FIG. 1B, the streaming SMIB operates with a video capture device 152 to encode video data outputted by the EGM into one or more video formats for streaming and communicate that video data to one or more video stream infrastructure components 140 of the live streaming platform 106.

In another example in which the streaming device is a personal gaming device operating with a remote game server, as seen in FIG. 1C, a video capture component 178 of the personal gaming device 172 uploads certain of the live stream data to the video stream infrastructure component 140 of the live streaming platform 106. In certain embodiments in which the streaming device comprises a personal gaming device 172 operating with a remote game server 170 and a remote gaming platform 174 that maintains one or more user accounts and operates with the remote game server to enable wagering of plays of games with funds held in such maintained user accounts, to enable the capturing of live stream data and communication of the live stream data to one or more components of the live streaming platform, a video capture component 178 associated with the personal gaming device interfaces with zero, one or more peripheral devices (e.g., camera 118 and headset audio interface 120) to capture certain data of the live stream. In these embodiments, the streaming personal gaming device (operating with the video capture component and employing certain data communicated from the remote game server and/or the remote gaming platform) encode video data outputted by the personal gaming device into one or more video formats for streaming and communicate that video data to one or more video stream infrastructure components 140 of the live streaming platform 106.

Figure 2:
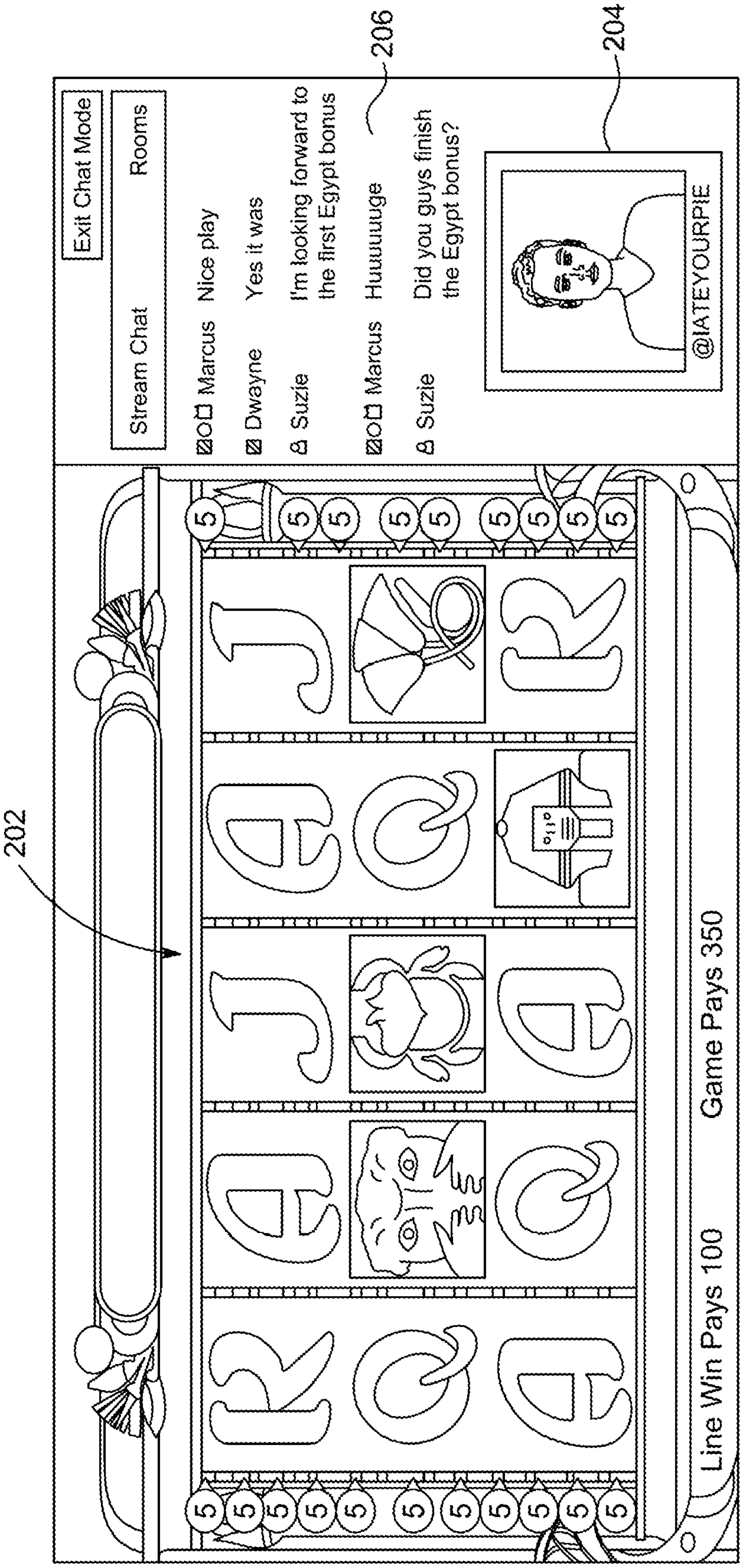
FIG. 2 is an example graphical user interface displayed to a viewer of a client device in association with a live stream of a gaming session occurring at a streaming device.

Following the upload of live streaming data, the live streaming platform enables one or more viewers at one or more client devices to access the live stream data. In certain embodiments, the live streaming platform enables viewers at the client devices to view the live stream and, in certain instances, interact with the streaming device. For example, as seen in FIGS. 1A to 1C, the live streaming platform 106 enables viewers at different client devices (e.g., a mobile client device 108*a*, a personal client device 108*b* and an EGM operating as a client device 108*c*) to view the live stream (including, but not limited to, as seen in FIG. 2, viewing a play of a game 202 and audio/video content of the user at the streaming device 204) and, in certain instances, interacting with the streaming device (including, but not limited to, as also seen in FIG. 2, chatting with the user at the streaming device 206 in one or more chat windows or chat rooms).

In certain embodiments, the live streaming platform enables any viewer to access any live stream associated with any streaming device. In certain embodiments, the live streaming platform restricts certain viewers from accessing certain live streams associated with certain streaming devices. In certain embodiments, the system restricts access to certain live streams based on one or more of an age of the viewer, a ranking of the viewer (e.g., a player tracking status of the viewer), a location of the viewer, any invitation to participate extended to the viewer, an age of the user, a location of the user, a ranking of the user (e.g., a player tracking status of the user), any invitation to participate extended to the user, any regulations pertaining to the age and/or location of the viewer, and/or any regulations pertaining to the age and/or location of the user.

In certain embodiments which impose one or more restrictions on viewers, the system enables a viewer to pay a fee (e.g., a daily fee, weekly fee, monthly fee or yearly fee) to view one or more live streams and/or participate in one or more live chats. In one such embodiment, if the system requires a viewer to pay to fully participate in the live stream, then in addition to any percentage of the fees allocated to the operator of the live streaming platform (e.g., the component associated with the gaming establishment operator 134 of FIGS. 1A to 1C), the system allocates a percentage of the fee to the user at the streaming device associated with the live stream. In another such embodiment, if the system requires a viewer to pay to fully participate in the live stream, then in addition to any percentage of the fees allocated to the operator of the live streaming platform, the system additionally or alternatively allocates a percentage of the fee to the gaming establishment where the streaming device associated with the live stream is at. In this embodiment, if the live streams associated with a user occurred via the user playing multiple streaming devices at multiple gaming establishments, the system splits the fees amongst the multiple gaming establishments based on any suitable fee splitting arrangement, such as based on hours played at each streaming device and/or coin-in at each streaming device.

In certain embodiments, the live streaming platform enables one or more viewers interfacing with a client device to access the live stream without further interactions. In these embodiments, the live streaming platform enables the viewer to passively observe the events occurring at the streaming device. In certain embodiments, the live streaming platform enables one or more viewers interfacing with a client device to access the live stream and further interact with the user at the streaming device. For example, live streaming platform interface 116 enables one or more chats to occur between the streaming device and zero, one or more client devices utilizing a chat component 142 of the live streaming platform 106 of FIGS. 1A to 1C. In these embodiments, upon an occurrence of a viewer interaction event, the live streaming platform enables the viewer to not only observe the events occurring at the streaming device but additionally interact with the user at the streaming device, such as by providing gifts to the user at the streaming device and/or participating in a conversation with the user at the streaming device. In certain embodiments, the live streaming platform enables one or more viewers interfacing with a client device to access the live stream and further interact with the live streaming platform to access certain wagering features. In these embodiments, upon an occurrence of a viewer interaction event, the live streaming platform enables the viewer to not only observe the events occurring at the streaming device from the client device but additionally interact with the live streaming platform from the client device to place one or more wagers on one or more events occurring at the streaming device which are part of the live stream.

In one embodiment wherein the viewer interfacing with a client device actively interacts with the live stream, following the viewer establishing and adequately funding a live streaming wagering account (e.g., account 128 maintained in association with the live streaming platform of FIGS. 1A to 1C) and accessing a live stream associated with a gaming session at a streaming device, the live streaming platform enables the viewer to place a back bet (e.g., back betting opportunities 136 offered in association with the live streaming platform of FIGS. 1A to 1C). Such back bets are based on the bet placed by the user at the streaming device and may be associated with a play of a game (e.g., the game 138 offered by the EGM operating as the streaming device of FIG. 1A) occurring at the streaming device and/or any wagerable event occurring at the streaming device that is independent of any play of any game. In this embodiment, if the user at the streaming device does not win any award based on the placed wager, then the viewer also loses the back bet. On the other hand, if the user at the streaming device wins an award (having a value greater than zero) based on the placed wager, then any viewer who was back betting along with the user at the streaming device will win the same amount. In one such embodiment, the system provides the entire win amount of the viewer to the viewer (to place another back bet or transfer to the live streaming wagering account). In another such embodiment, the system provides or otherwise automatically gifts a portion of the win amount of the viewer to the user at the streaming device.

In certain such embodiments in which the live streaming platform enables the viewer to place a back bet, such as a wager on a play of a wagering game occurring at an EGM operating as the streaming device, in association with the play of the wagering game, the EGM streaming device notifies an associated SMIB of the EGM, using SAS or another gaming protocol, when a game starts, when a wager is placed (COIN IN), when an amount is won (COIN OUT) and when a game ends. Using these events, the EGM to SMIB “Game Start” message includes data associated with the wager amount placed at the EGM operating as the streaming device (and could be implemented with the SAS protocol message, such as 0x7E) and the EGM to SMIB “Game End” message includes data associated with the win amount resulting from the wager placed (and could be implemented by the SAS protocol message, such as 0x7F). Using at least these interactions (and assuming that the amount of the back bet is the same as the wager placed at the streaming device and that the live streaming platform credits the account of the user of the client device with the matching amount of the win occurring at the streaming device), the live streaming platform can proceed with resolving the back bet placed. That is, if the user at the streaming device does not win any award based on the placed wager at the streaming device, then the live streaming platform determines that the viewer at the client device also loses the back bet. Conversely, if the user at the streaming device wins an award (having a value greater than zero) based on the placed wager at the streaming device, then the live streaming platform determines that the viewer at the client device who placed a back bet (of the same amount as the wager placed at the streaming device) will win an award of the same amount. For example, if the user of the streaming device wagered $1.00 and won $5.00, then if the user of the client device wagered $1.00, the live streaming platform determines that the user of the client device also wins $5.00. Likewise, if the user of the streaming device wagered $1.00 and lost (i.e., won $0.00), then the live streaming platform determines that the user of the client device also loses their $1.00 wagered. It should be appreciated that such a configuration further enables scaling of the wager amount and the win amount to resolve the back bet placed. For example, if the user of the streaming device wagered $1.00 and won $5.00 and if the user of the client device wagered $0.50 (i.e., half of the $1.00 wagered at the streaming device), then the live streaming platform determines that the user of the client device wins $2.50 (half of the $5.00 won at the streaming device).

In another embodiment wherein the viewer interfacing with a client device actively interacts with the live stream, following the viewer establishing and adequately funding a live streaming wagering account and accessing a live stream associated with a gaming session at a streaming device, the live streaming platform enables the viewer at the client device to place a bet on a play of a game or other event occurring at the streaming device independent of any bet placed by the user at the streaming device. In this embodiment, the system enables a wager to be placed by the viewer at the client device on any suitable event that may or may not occur in association with one or more plays of one or more games at the streaming device and/or independent of any such plays at the streaming device. That is, the live streaming platform enables the viewer at the client device to wager on different events occurring in association with the streaming device, such as, but not limited to, the type of wins occurring at the streaming device, the amount of wins/losses occurring at the streaming device, any changing in a credit meter of the streaming device, any bonus being hit or other game event to be trigger at the streaming device including the number of times the event happened. For example, the live streaming platform enables the viewer at the client device to place a wager that a three cherry wining symbol combination will occur in the next ten games played at the streaming device, during a session of gaming at the streaming device, over a period of time (e.g., one minute) of gaming at the streaming device, and/or during a time window (e.g. 1:01 pm until 1:03 pm) of gaming at the streaming device. In different embodiments, the system provides the entire win amount of any winning wager of the viewer to the viewer (to place another bet or transfer to the live streaming wagering account) or the system provides a portion of the win amount of any winning wager to the viewer to the viewer, such as by automatically gifting a portion of the win amount of the viewer to the user at the streaming device.

In another embodiment wherein the viewer interfacing with a client device actively interacts with the live stream, following the viewer establishing and adequately funding a live streaming wagering account and accessing a live stream associated with a gaming session at a streaming device, the live streaming platform enables the viewer to place a bet against one or more other viewers (and/or one or more users at one or more streaming devices). For example, the system enables a viewer to place a bet on which user will win an ongoing tournament. In this embodiment, if the wagered on user does not win the ongoing tournament, then the viewer loses their wager. On the other hand, if the wagered on user wins the ongoing tournament, then the system provides the viewer an award based on the lost wagers placed by one or more other viewer (and/or one or more users at one or more streaming devices) minus a percentage held by the system.

In different embodiments, the system of the present disclosure is configured to enable the play of any suitable game, such as a wagering game, a non-wagering casual game, and/or a non-wagering social game, occurring at a streaming device to be streamed to one or more viewers at one or more client devices. In certain embodiments, the game comprises a play of a primary game, such as a primary wagering game, wherein the game triggering event includes the placement of a wager on the play of the primary game. In certain embodiments, the game comprises a play of a secondary game, such as a free spin game, wherein the game triggering event occurs based on a displayed event associated with a play of a wagered on primary game. In certain embodiments wherein the game comprises a secondary game, such as a free spin game, the game triggering event occurs based on an event independent of any displayed event associated with the play of the wagered on primary game. In various embodiments, the displayed play of the wagering game, the non-wagering casual game and/or the non-wagering social game includes, but is not limited to: a play of any suitable spinning reels game, a play of any suitable wheel game; a play of any suitable card game such as blackjack, poker or baccarat; a play of any suitable keno game; a play of any suitable bingo game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable partial skill game; a play of any suitable auction game; a play of any suitable reverse-auction game; a play of any suitable group game; and/or a play of any other game of the present disclosure.

In certain embodiments, the awards available to be won by one or more viewers of one or more client devices in association with one or more wagers placed by such viewers of such client devices as well as the awards available to the user of the streaming device include, but are not limited to, one or more of: a quantity of monetary credits, a quantity of non-monetary credits, a quantity of promotional credits, a quantity of player tracking points, an amount of cryptocurrency, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the system, virtual goods not associated with the system, an access code usable to unlock content on an internet. In certain embodiments, one or more wagers placed by one or more viewers of one or more client devices as well as one or more users of one or more streaming devices include, but are not limited to, a quantity of monetary credits, a quantity of non-monetary credits, a quantity of promotional credits, and/or a quantity of player tracking points.

In various embodiments, as mentioned above, the systems of the present disclosure enable a user of a client device the opportunity to wager on plays of games occurring at a streaming device and/or enable the user of the client device to interact with a user of the streaming device. In certain embodiments, upon a recollection event occurring in association with the user of the client device, the user of the streaming device and/or an operator of the live streaming platform, the system recalls certain information associated with zero, one or more events that occurred (or did not occur) in the streaming environment. The system then enables the user of the client device, the user of the streaming device and/or the operator of the live streaming platform access to such recalled information. In certain embodiments, upon a recollection event occurring independent of the user of the client device, the user of the streaming device and/or an operator of the live streaming platform, the system recalls certain information associated with zero, one or more events that occurred (or did not occur) in the streaming environment and utilizes such recalled information in association with the recollection event.

It should be appreciated that as different events occur in association with the game streamed from the streaming device (and/or as different events occur in the streaming environment independent of any games being played at the streaming device), the system stores certain data associated with such events. For example, the live streaming platform stores streamed game history information for the last fifty games played. Such stored historical data may be employed differently by different entities, such as employed by a user of a client device to recreate positive past streaming experiences and employed by the user of the streaming device to analyze and improve upon prior interactive content generated by that user.

In certain embodiments, the system stores streamed game history information regarding previous streamed games played (such as, but not limited to, an amount wagered at the streaming device, any amounts wagered at any client devices, the outcome of the streamed game, any award won at the streaming device and/or any awards won at the client devices) and streamed non-game history information displayed or otherwise conveyed in association with, but separate from, the previous streamed games played (such as, but not limited to, interactions that occurred between the user of the client device and the user of the streaming device, and interactions that occurred between the users of different client devices). In these embodiments, the information stored is detailed enough to reconstruct at least a portion of the graphical presentation that was previously presented by the streaming device and/or any client devices and/or reconstruct a state of the streaming device and/or a state of any client devices (e.g., an amount of a credit balance) at a specific historical point in time.

In certain embodiments, if a recollection event taking the form of a dispute occurs, the system utilizes such stored data to reconstruct the state of the game streamed from the streaming device (and/or the state of streaming environment independent of any games being played at the streaming device) in an attempt to resolve the dispute. For example, a user of a client device may decide that in a previous streamed game of chance that they did not receive credit for an award that they believed they won. In this example, the streamed game history information may be used to reconstruct the state of the client device before, during, and/or after the disputed streamed game to demonstrate whether the user was correct or not in the user's assertion.

In certain embodiments, if a recollection event taking the form of a malfunction or other interruption event occurs, the system utilizes such stored data to reconstruct the state of the game streamed from the streaming device (and/or the state of streaming environment independent of any games being played at the streaming device). For example, when a malfunction occurs during a streamed game of chance, the live streaming platform restores a state in the streamed game of chance just before when the malfunction occurred.

In certain embodiments, the recollection event occurs responsive to one or more inputs made by a requestor (e.g., the user of the client device, the user of the streaming device and/or the operator of the live streaming platform) in association with one or more questions pertaining to one or more events that occurred (or did not occur) in the streaming environment. In these embodiments, following the occurrence of the recollection event, the system causes the display of relevant historical information to potentially answer the questions asked. In certain embodiments, the type of historical information provided, the amount of historical information provided, the format of the historical information provided and/or whom the historical information is provided to, is based on the questions asked and/or an identify of the entity asking the questions.

Figure 3A:
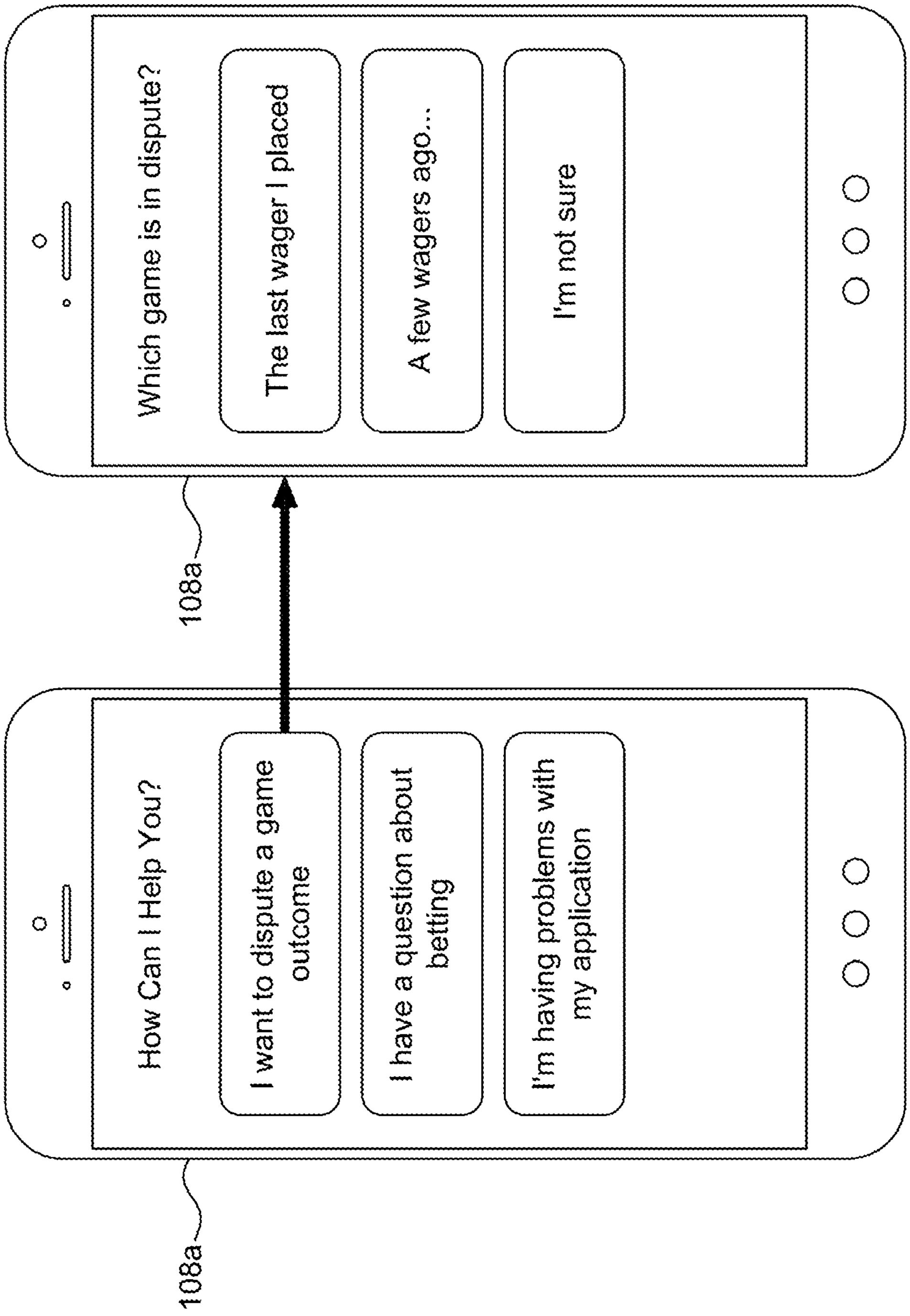
FIG. 3A is an example sequence of graphical user interfaces displayed to a user of a client device in association with an inquiry into a potential historical event of a live stream of a gaming session occurring at a streaming device.

In certain embodiments, the system utilizes one or more prompts to guide the user of the client device to the appropriate question to be asked. In these embodiments, the live streaming platform offers an interactive application that may be triggered by a user of the client device, such as by engaging a customer service icon, and which enables the user of the client device to interface with the live streaming platform to gather information prior to (or otherwise in association with) lodging a dispute over one or more events that occurred in the streaming environment. For example, as seen in FIG. 3A, through a series of prompts, the system enables the user of the client device to indicate that might request to dispute an identified wager placed (e.g., the last wager placed) and/or a non-identified wager placed (e.g., a wager placed five or ten wagers ago) and/or request additional information (prior to submitting a dispute) regarding an identified wager placed and/or a non-identified wager placed.

Figure 3B:
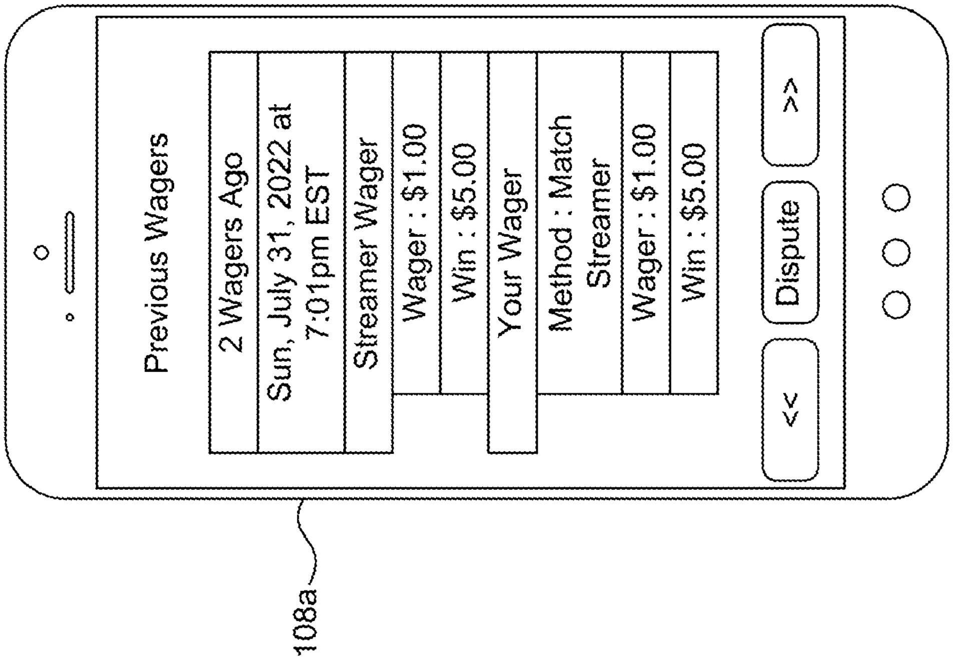
FIG. 3B is an example graphical user interface displayed to a user of a client device in association with a potential historical event of a live stream of a gaming session occurring at a streaming device.

In certain embodiments, if the user of the client device is unaware of which particular event to dispute, the system provides various information to the user of the client device to assist the user of the client device. In one such embodiment, following the client device requesting certain stored historical information from the live streaming platform, such as a listing of previous wagers placed by the client device, and the live streaming platform communicating all or part of the requested historical information to the client device, the client device proceeds with displaying an interface that conveys such historical information to the user of the client device. For example, as seen in FIG. 3B, the client device displays a user interface that includes historical information regarding one or more events and further enables the user of the client device to navigate (such as using "previous" and "next" icons) through such events.

Figure 3C:
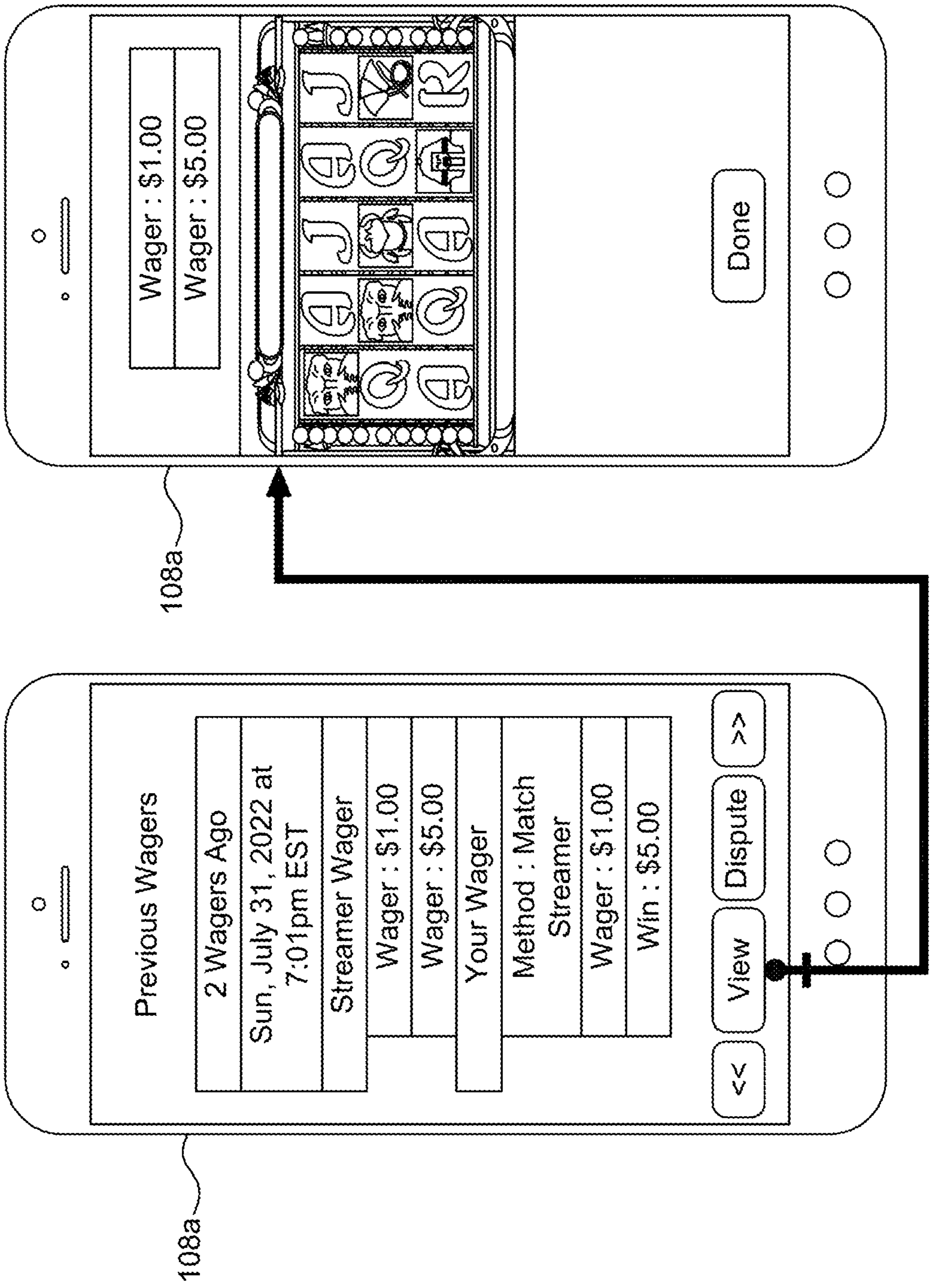
FIG. 3C is an example sequence of graphical user interfaces displayed to a user of a client device in association with reviewing a previous play of a streamed game from a live stream of a gaming session occurring at a streaming device.

It should be appreciated that the interface employed by the client device enables the user of the client device to not only identify a particular event to potentially dispute, but further provides certain information regarding the event to the user prior to any requested dispute, thereby minimizing the lodging of certain unfounded disputes from even being requested. That is, prior to disputing an event, the system enables the user of the client device to request additional information associated with the event in question to potentially avert the user from formally filing a dispute (which requires computing and/or personnel resources to resolve). For example, as seen in FIG. 3C, after identifying a particular prior streamed game of interest, the system enables the user of the client device to view a video, a partial video and/or one or more images pertaining to the prior streamed game. Such a configuration provides a streamlined interface for a user of a client device, a user of a streaming device and/or an operator of a live streaming platform to access information pertaining to events that may (or may not) have occurred in the streaming environment to enable such a user to gather more information before proceeding with certain further actions.

In certain embodiments, following a receipt of the request from the client device, the live streaming platform retrieves the video, partial video and/or images from a streamed game history storage component and communicates data associated with the video, partial video and/or images to the client device to be displayed. In certain other embodiments, following a receipt of the request from the client device, the live streaming platform communicates a location of the video, partial video and/or images, such as a uniform resource location, to the client device and the client device utilizes the location information to retrieve the video, partial video and/or images from a streamed game history storage component.

Figure 3D:
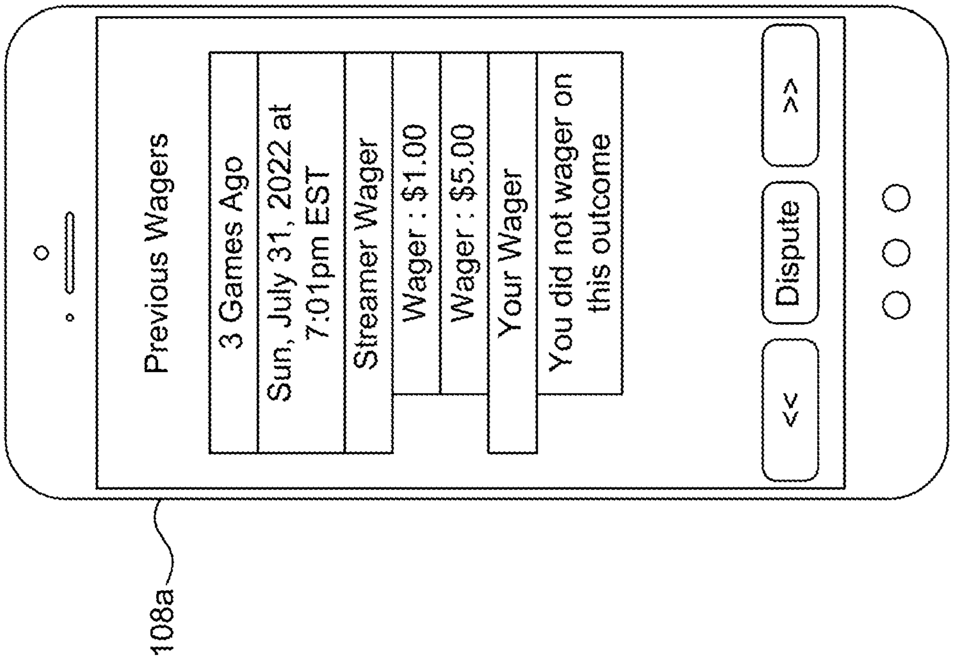
FIG. 3D is an example graphical user interface displayed to a user of a client device in association with a potential dispute of a historical event of a live stream of a gaming session occurring at a streaming device.

In certain embodiments, following the identification of a particular event to potentially dispute (possibly aided with the use of the interactive application), and following the user of the client device making one or more inputs to proceed with a dispute of the identified event, the live streaming platform (and/or an operator of the live streaming platform) reviews the historical information associated with the disputed event and resolves the dispute, such as by finding in favor of the user of the client device (e.g., refunding the user of the client device a wager placed), finding against the user of the client device, or engaging with the user of the client device to discuss further. In certain embodiments, in resolving the dispute, the interactive application provides additional information to the user of the client device that assists the user of the client device in understanding why a dispute was resolved as it was. For example, as seen in FIG. 3D, following a determination that a client device failed to wager on a particular streamed game, the live streaming platform communicates information to the client device which enables the client device to display not only how the dispute is resolved but why the dispute is resolved as it was. In this example, upon a determination that a streaming device displayed each of the outcomes of five game cycles, but the client device only wagered on three of the game cycles (and did not wager on the disputed game cycle), the system displays to the user of the client device certain information pertaining to the timeline of activity occurring at the client device (and/or certain information pertaining to the timeline of activity occurring at the streaming device) which assist the user of the client device in having a better understanding of the dispute resolution process. Such a configuration thus enables different parties to efficiently resolve a dispute without the need to dedicate additional resources beyond the data already utilized by the live streaming platform.

In certain embodiments, different users have different access to historical information. In these embodiments, based on an identity of the user and/or the recollection event that occurred (i.e., the purpose of requesting to access historical information), the system determines which historical information to provide to which user. For example, while the system enables any user of a client device and/or streaming device to access historical information in association with a potential dispute of the result of a prior streamed game, the system limits access to historical information separate from in association with a potential dispute to users of streaming devices and users of client devices that have a certain status above a threshold status.

In certain embodiments, in addition to interfacing with a user of a client device to facilitate possible dispute resolutions in a relatively more efficient manner (e.g., via a pre-dispute review of historic information), the system enables an operator of the live streaming platform (and/or regulatory personnel) access to certain additional historic information regarding zero, one or more events that occurred (or did not occur) in the streaming environment. In these embodiments, in addition to the historic information available to the user of the client device and/or the user of the streaming device, the system enables the operator of the live streaming platform (and/or regulatory personnel) supplemental information used to identify the client device (e.g., a live streaming account number of the user of the client device, a media access control address of the client device, hardware and/or software versions of the client device) and/or used to identify the streaming device (e.g., an EGM identifier of the streaming device).

Figure 3E:
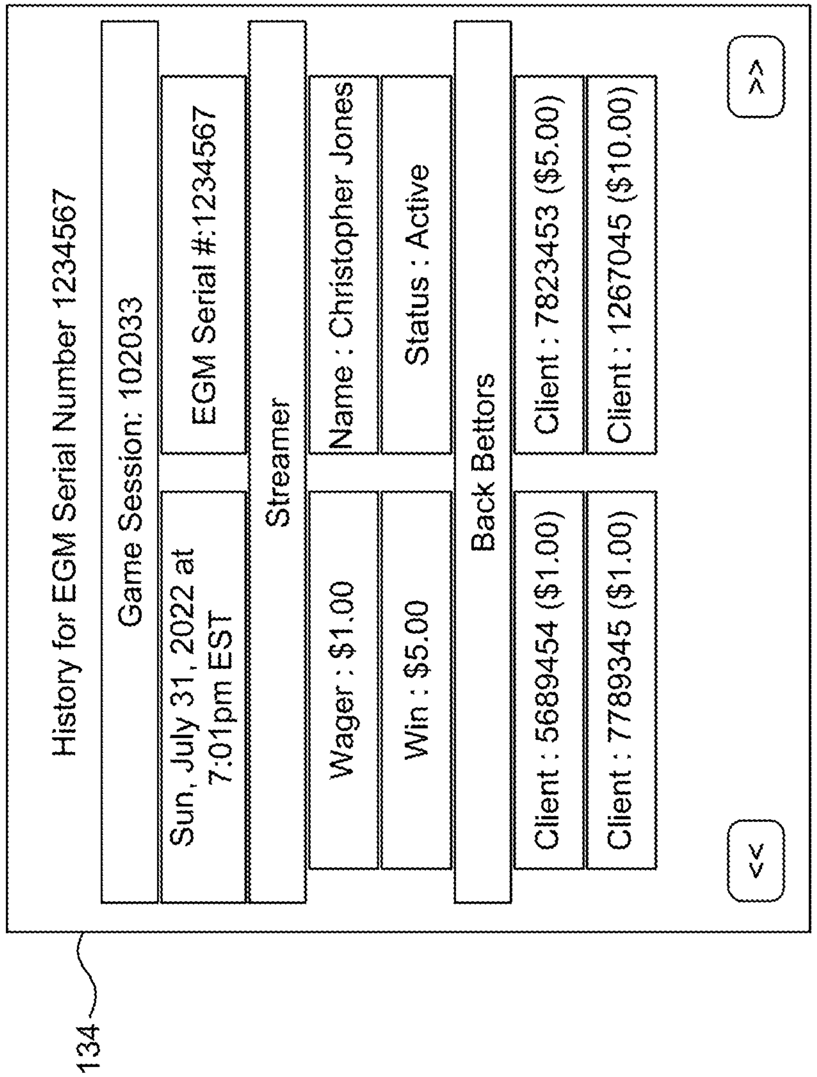
FIG. 3E is an example graphical user interface displayed to an operator of a live streaming platform in association with historical events of a live stream of a gaming session occurring at a streaming device.
Figure 3F:
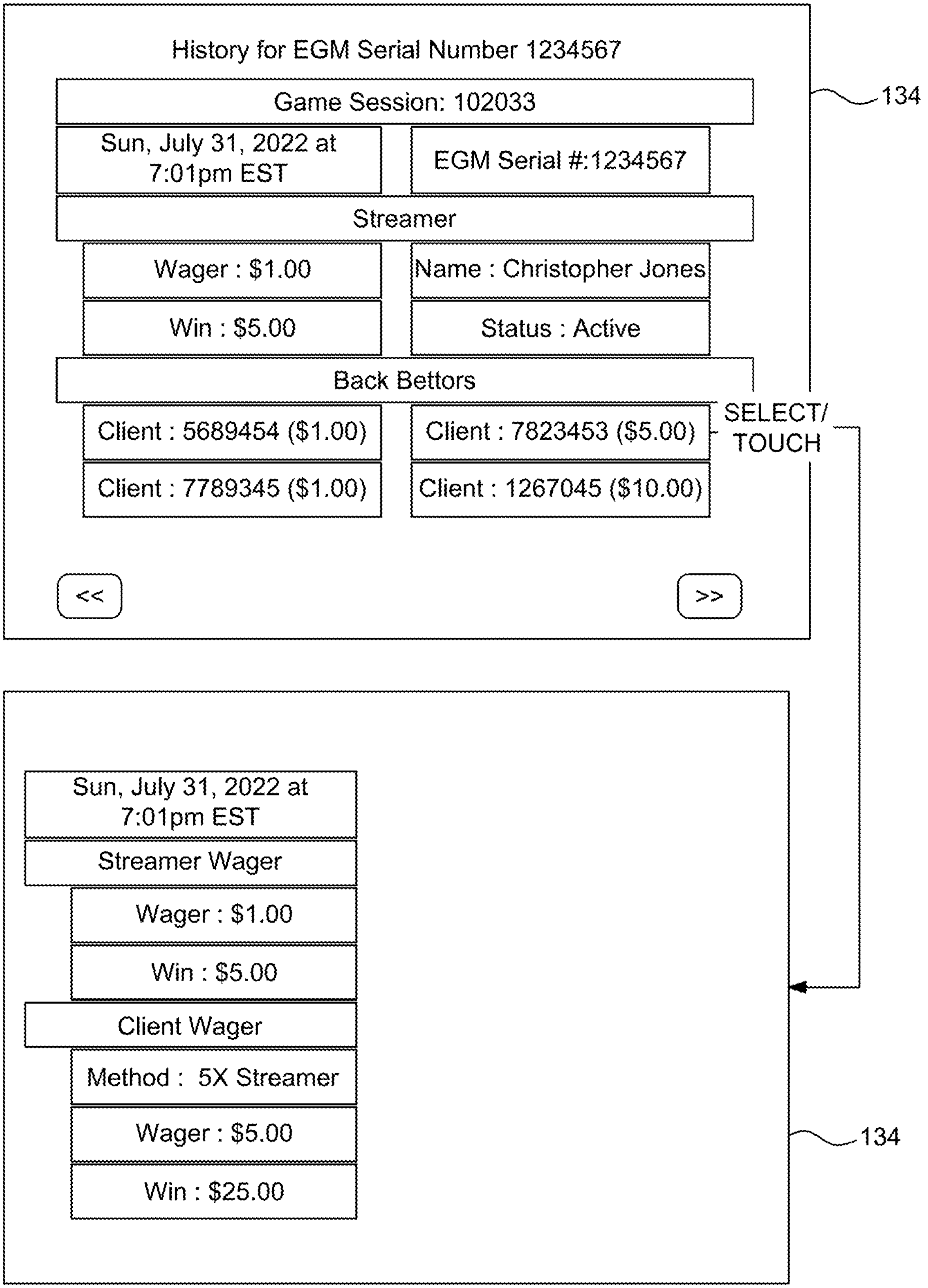
FIGS. 3F, 3G and 3H are each example sequences of graphical user interfaces displayed to an operator of a live streaming platform in association with historical events of a live stream of a gaming session occurring at a streaming device.

In certain embodiments, the system enables the operator of the live streaming platform to view historic information associated with a streaming session. In certain such embodiments, the system causes an operator workstation to display a summary of each game of a streaming session originating from a streaming device and which client devices participated in the wagering on that game. For example, as seen in FIG. 3E, for an identified streaming session occurring in association with a streaming device, the system displays a snapshot of which game was played at the streaming device and which users of which client devices wagered on such a game. In certain embodiments, the system additionally enables the operator of the live streaming platform to select certain historic information to obtain details regarding that historic information. For example, as seen in FIG. 3F, for an identified streaming session occurring in association with a streaming device, the system enables the operator to select a particular client device to be displayed and the system provides more detailed information regarding that particular client device and a streamed game played at the streaming device.

In certain embodiments, the system enables the operator of the live streaming platform to search for specific historic information associated with one or more client devices and/or streaming devices. In certain embodiments, the system additionally or alternatively enables the operator of the live streaming platform to filter in (or filter out) specific historic information associated with one or more client devices and/or streaming devices. In different embodiments, the system enables the operator to search and/or filter based on one or more of: an identifier of the user of a client device (e.g., a name or account number of a user of the client device), an identifier of the user of the streaming device (e.g., a name or account number of a user of the streaming device), an identifier of the client device (e.g., a media access control address of the client device, a type of client device), an identifier of the streaming device (e.g., an EGM identifier of the streaming device), a location of the client device, a location of the streaming device, a streaming session identifier, a streamed game identifier, a type of wager placed, an amount of a wager placed, a type of outcome determined (e.g., a win or a win type), an amount associated with an outcome determined, a date and time of a streamed game, and/or a period of time of a streaming session.

In certain embodiments, the historic information accessible to the operator of the live streaming platform includes video, partial video and/or images of the streamed game to be reviewed. In certain such embodiments in which the streaming device is an EGM, the SMIB of the EGM streaming device encodes the video displayed by the streaming device and communicates the encoded video to the live streaming platform for distribution to the client devices and additional for storage. In these embodiments, upon a subsequent request, the live streaming platform retrieves the stored video data and communicates such stored video data to an operator workstation for review. In certain other embodiments in which the streaming device is an EGM, the SMIB of the EGM streaming device encodes the video displayed by the streaming device and communicates the encoded video to the live streaming platform for distribution to the client devices and to a separate streamed game history storage component for storage. In these embodiments, upon a subsequent request, the system retrieves the stored video data from the streamed game history storage component and communicates such stored video data to an operator workstation for review.

In certain embodiments, the live streaming platform (and/or a streamed game history storage component) retains all video data and all image data of the streamed games for potential review. In certain other embodiments, based on the amount of data associated with such videos and images of the streamed games, the system adapts how such data is saved, which data is saved and/or how long such data is saved. That is, rather than saving all video and/or image data displayed by the streaming device and each client device, the system modifies one or more storage parameters regarding this data to save bandwidth and storage capacity for the system.

In certain such embodiments, the live streaming platform (and/or a streamed game history storage component) retains the videos and images of the streamed games (as displayed at the streaming device and/or as displayed at one or more client devices) at a lower quality to minimize storage requirements. In certain other embodiments, the live streaming platform (and/or a streamed game history storage component) additionally or alternatively retains the videos and images of the streamed games (as displayed at the streaming device and/or as displayed at one or more client devices) at a lower frame rate to minimize storage requirements. In certain other embodiments, the live streaming platform (and/or a streamed game history storage component) additionally or alternatively retains the videos and images of the streamed games (as displayed at the streaming device and/or as displayed at one or more client devices) at a modified compression setting to minimize storage requirements. In certain other embodiments, the live streaming platform (and/or a streamed game history storage component) additionally or alternatively retains the videos and images of the streamed games (as displayed at the streaming device and/or as displayed at one or more client devices) based on one or more storage parameters as set by the operator of the live streaming platform. In certain other embodiments, the live streaming platform (and/or a streamed game history storage component) additionally or alternatively retains the videos and images of the streamed games (as displayed at the streaming device and/or as displayed at one or more client devices) for a period of time prior to deleting such data (e.g., video data is stored for six months from streaming and then deleted).

In certain other embodiments, the live streaming platform (and/or a streamed game history storage component) additionally or alternatively retains the videos and images of the streamed games as displayed at the streaming device and as displayed at one or more client devices that placed a wager on that streamed game to minimize storage requirements. In these embodiments, the live streaming platform (and/or a streamed game history storage component) does not store such data for client devices that did not place wagers on the streamed game.

In certain other embodiments, the live streaming platform (and/or a streamed game history storage component) additionally or alternatively retains the videos and images of the streamed games (as displayed at the streaming device and/or as displayed at one or more client devices) from game start to game end to minimize storage. In these embodiments, the live streaming platform uses the SMIB "Game Start" message and the SMIB "Game End" message to indicate when to start and stop recording.

In certain other embodiments, the SMIB encodes metadata into the video stream indicating the start and end of the game cycle and the live streaming platform uses this encoded metadata to identify which parts of the game cycle to store for historical purposes. In these embodiments, in addition to the SMIB encoding video of the streaming device to be communicated to the live streaming platform to form part or all of the live stream, the SMIB inserts the metadata into the stream for game start and game end events (or alternatively sends separate start and end tags or metadata) for the live streaming platform to identify which parts of the streamed game to record and store for history.

Figure 3G:
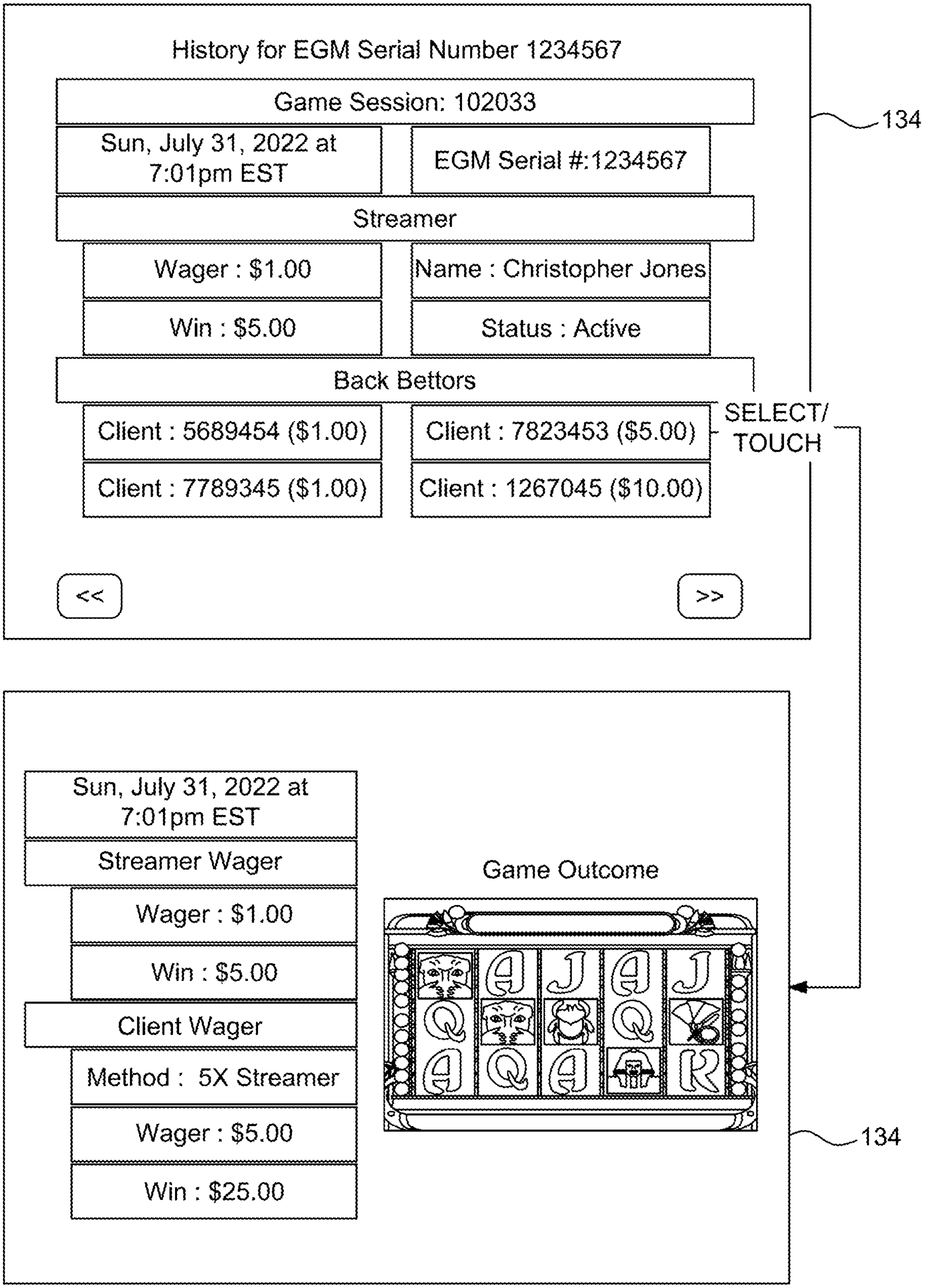

In certain embodiments in which the historic information accessible to the operator of the live streaming platform includes video, partial video and/or images of the streamed game to be reviewed, the live streaming platform enables an operator to review video/image data of the game outcome of the streamed game as displayed by the client device. For example, as seen in FIG. 3G, for an identified streaming session occurring in association with a streaming device, the system enables the operator to select a particular client device and the system proceeds to display wagering information of the client device, wagering information of the streaming device as well as video and/or images of the game outcome of the streamed game as displayed at the client device.

Figure 3H:
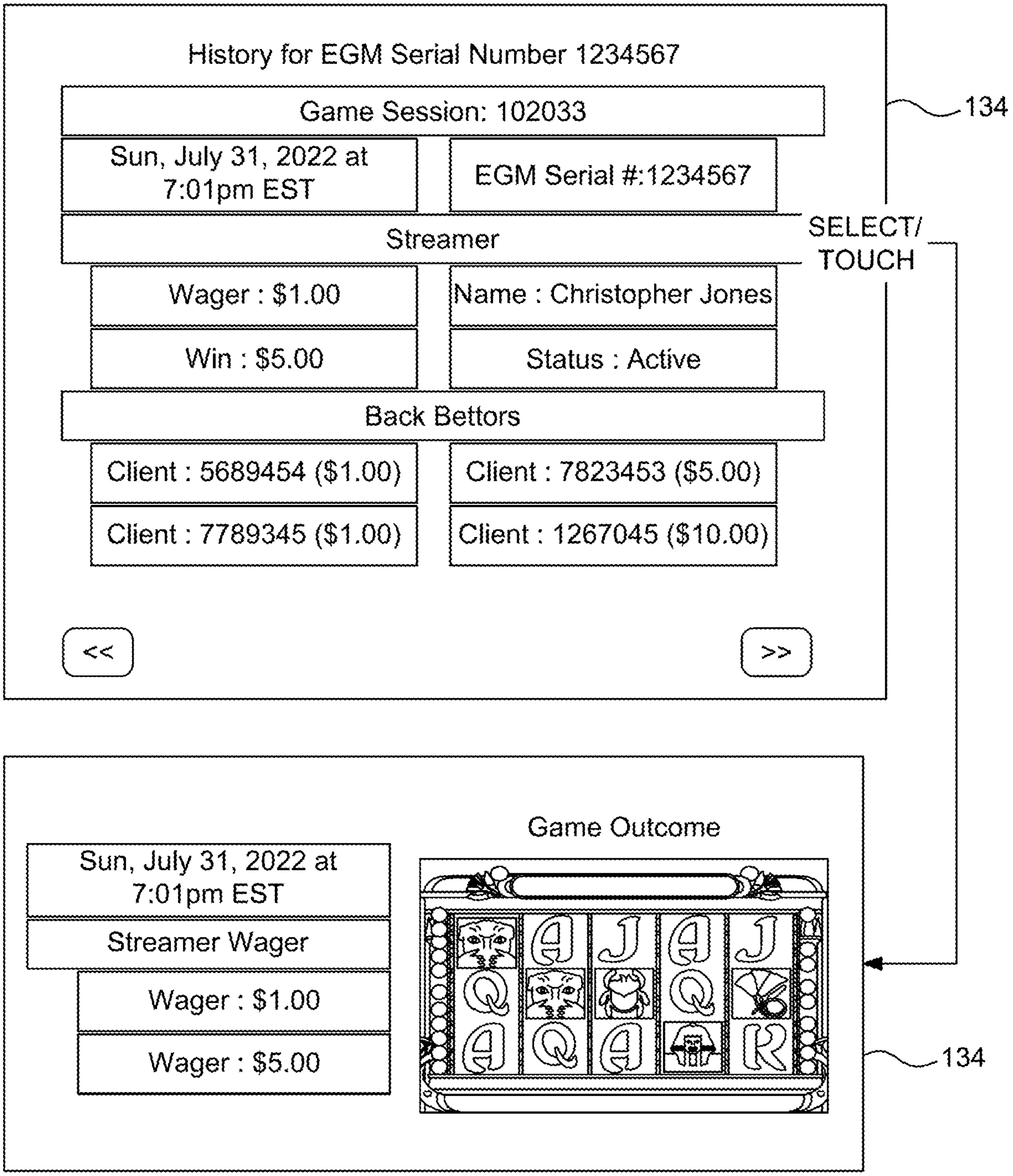

In certain embodiments in which the historic information accessible to the operator of the live streaming platform includes video, partial video and/or images of the streamed game to be reviewed, the live streaming platform enables an operator to review historic information of the game outcome of the streamed game displayed at the client device while also reviewing video/image data of the game outcome of the streamed game as displayed at the streaming device device. For example, as seen in FIG. 3H, for an identified streaming session occurring in association with a streaming device, the system enables the operator to select the streaming device and the system proceeds to display wagering information as well as video and/or images of the game outcome of the game displayed at the streaming device.

Accordingly, upon a recollection event occurring in association with a user of the client device, a user of the streaming device and/or an operator of the live streaming platform, the system of the present disclosure recall certain information associated with zero, one or more events that occurred (or did not occur) in the streaming environment. The system then enables the user of the client device, the user of the streaming device and/or the operator of the live streaming platform access to such recalled information. Such a configuration provides a streamlined interface for a user of a client device, a user of a streaming device and/or an operator of a live streaming platform to access information pertaining to events that may (or may not) have occurred in the streaming environment. Such a configuration further enables different parties to efficiently resolve a dispute (or avoid proceeding to even asserting a dispute) without the need to dedicate additional resources beyond the data already utilized by the live streaming platform.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "streaming device" and/or "client device" as used herein refers to various configurations of: (a) one or more servers; (b) one or more electronic gaming machines; (c) one or more components of a gaming establishment management system associated with an electronic gaming machine, such as a slot machine interface board; (d) one or more devices associated with an electronic gaming machine, such as a slot machine interface board, operating independent of any components of a gaming establishment management system, and/or (e) one or more personal gaming devices (e.g., desktop computers, laptop computers, tablet computers or computing devices, personal digital assistants, mobile phones, and other mobile computing devices). Thus, in various embodiments, the streaming devices and client devices of the present disclosure include: (a) one or more electronic gaming machines in combination with one or more servers; (b) one or more slot machine interface boards (or other components of a gaming establishment management system or other components independent of a gaming establishment management system) in communication with one or more servers; (c) one or more personal gaming devices in combination with one or more servers; (d) one or more personal gaming devices in combination with one or more electronic gaming machines;

(e) one or more personal gaming devices in combination with one or more slot machine interface boards (or other components of a gaming establishment management system or other components independent of a gaming establishment management system); (f) one or more personal gaming devices, one or more electronic gaming machines, one or more slot machine interface boards (or other components of a gaming establishment management system or other components independent of a gaming establishment management system) and one or more servers in combination with one another; (g) a single electronic gaming machine; (h) a plurality of electronic gaming machines in combination with one another; (i) a single personal gaming device; (j) a plurality of personal gaming devices in combination with one another; (k) as single slot machine interface board (or another component of a gaming establishment management system or another component independent of a gaming establishment management system); (l) a plurality of slot machine interface boards (or other components of a gaming establishment management system or other components independent of a gaming establishment management system) in combination with one another; (m) a single server; and/or (n) a plurality of servers in combination with one another. For brevity and clarity and unless specifically stated otherwise, "streaming device as used herein represents one streaming device or a plurality of streaming devices, "client device" as used herein represents one client device or a plurality of client devices and "server" as used herein represents one server or a plurality of servers.

As noted above, in various embodiments, the system includes a streaming device and/or a client device in combination with a server. In such embodiments, the streaming device and/or client device is configured to communicate with the server through a data network or remote communication link. In certain such embodiments, the streaming device and/or client device is configured to communicate with another streaming device and/or client device through the same data network or remote communication link or through a different data network or remote communication link.

In certain embodiments in which the system includes a streaming device and/or a client device in combination with a server, the server is any suitable computing device (such as a server) that includes at least one processor and at least one memory device or data storage device. As further described herein, the streaming device and/or client device includes at least one streaming device and/or client device processor configured to transmit and receive data or signals representing events, messages, commands, or any other suitable information between the streaming device and/or client device and the server. The at least one processor of that streaming device and/or client device is configured to execute the events, messages, or commands represented by such data or signals in conjunction with the operation of the streaming device and/or client device. Moreover, the at least one processor of the server is configured to transmit and receive data or signals representing events, messages, commands, or any other suitable information between the server and the streaming device and/or client device. The at least one processor of the server is configured to execute the events, messages, or commands represented by such data or signals in conjunction with the operation of the server. One, more than one, or each of the functions of the server may be performed by the at least one processor of the streaming device and/or client device. Further, one, more than one, or each of the functions of the at least one processor of the streaming device and/or client device may be performed by the at least one processor of the server.

In certain such embodiments, computerized instructions for controlling any games (such as any primary or base games and/or any secondary or bonus games) displayed by the streaming device and/or client device are executed by the server. In such "thin client" embodiments, the server remotely controls any games (or other suitable interfaces) displayed by the streaming device and/or client device, and the streaming device and/or client device is utilized to display such games (or suitable interfaces) and to receive one or more inputs or commands. In other such embodiments, computerized instructions for controlling any games displayed by the streaming device and/or client device are communicated from the server to the streaming device and/or client device and are stored in at least one memory device of the streaming device and/or client device. In such "thick client" embodiments, the at least one processor of the streaming device and/or client device executes the computerized instructions to control any games (or other suitable interfaces) displayed by the streaming device and/or client device.

In various embodiments in which the system includes a plurality of streaming devices and/or client devices, one or more of the streaming devices and/or client devices are thin client streaming devices and/or client devices and one or more of the streaming devices and/or client devices are thick client streaming devices and/or client devices. In other embodiments in which the system includes one or more streaming devices and/or client devices, certain functions of one or more of the streaming devices and/or client devices are implemented in a thin client environment, and certain other functions of one or more of the streaming devices and/or client devices are implemented in a thick client environment. In one such embodiment in which the system includes a streaming device and/or a client device and a server, computerized instructions for controlling any primary or base games displayed by the streaming device and/or client device are communicated from the server to the streaming device and/or client device in a thick client configuration, and computerized instructions for controlling any secondary or bonus games or other functions displayed by the streaming device and/or client device are executed by the server in a thin client configuration.

In certain embodiments in which the system includes: (a) a streaming device and/or a client device configured to communicate with a server through a data network; and/or (b) a plurality of streaming devices and/or client devices configured to communicate with one another through a data network, the data network is a local area network (LAN) in which the streaming devices and/or client devices are located substantially proximate to one another and/or the server. In one example, the streaming devices and/or client devices and the server are located in a gaming establishment or a portion of a gaming establishment. In other embodiments in which the system includes: (a) a streaming device and/or a client device configured to communicate with a server through a data network; and/or (b) a plurality of streaming devices and/or client devices configured to communicate with one another through a data network, the data network is a wide area network (WAN) in which one or more of the streaming devices and/or client devices are not necessarily located substantially proximate to another one of the streaming devices and/or client devices and/or the server. For example, one or more of the streaming devices and/or client devices are located: (a) in an area of a gaming establishment different from an area of the gaming establishment in which the server is located; or (b) in a gaming establishment different from the gaming establishment in which the server is located. In another example, the server is not located within a gaming establishment in which the streaming devices and/or client devices are located. In certain embodiments in which the data network is a WAN, the system includes a server and a streaming device and/or a client device each located in a different gaming establishment in a same geographic area, such as a same city or a same state. Systems in which the data network is a WAN are substantially identical to systems in which the data network is a LAN, though the quantity of streaming devices and/or client devices in such systems may vary relative to one another.

In further embodiments in which the system includes: (a) a streaming device and/or a client device configured to communicate with a server through a data network; and/or (b) a plurality of streaming devices and/or client devices configured to communicate with one another through a data network, the data network is an internet or an intranet. In certain such embodiments, an internet browser of the streaming device and/or client device is usable to access an internet game page from any location where an internet connection is available. In one such embodiment, after the streaming device and/or client device accesses the internet game page, the server identifies a user before enabling that user to place any wagers on any plays of any wagering games. In one example, the server identifies the user by requiring a user account of the user to be logged into via an input of a unique username and password combination assigned to the user. The server may, however, identify the user in any other suitable manner, such as by validating a player tracking identification number associated with the user; by reading a player tracking card or other smart card inserted into a card reader (as described below); by validating a unique user identification number associated with the user by the server; or by identifying the streaming device and/or client device, such as by identifying the MAC address or the IP address of the internet facilitator. In various embodiments, once the server identifies the user, the server enables placement of one or more wagers on one or more plays of one or more primary or base games and/or one or more secondary or bonus games, and displays those plays via the internet browser of the streaming device and/or client device.

The server and the streaming device and/or client device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium.

Figure 4:
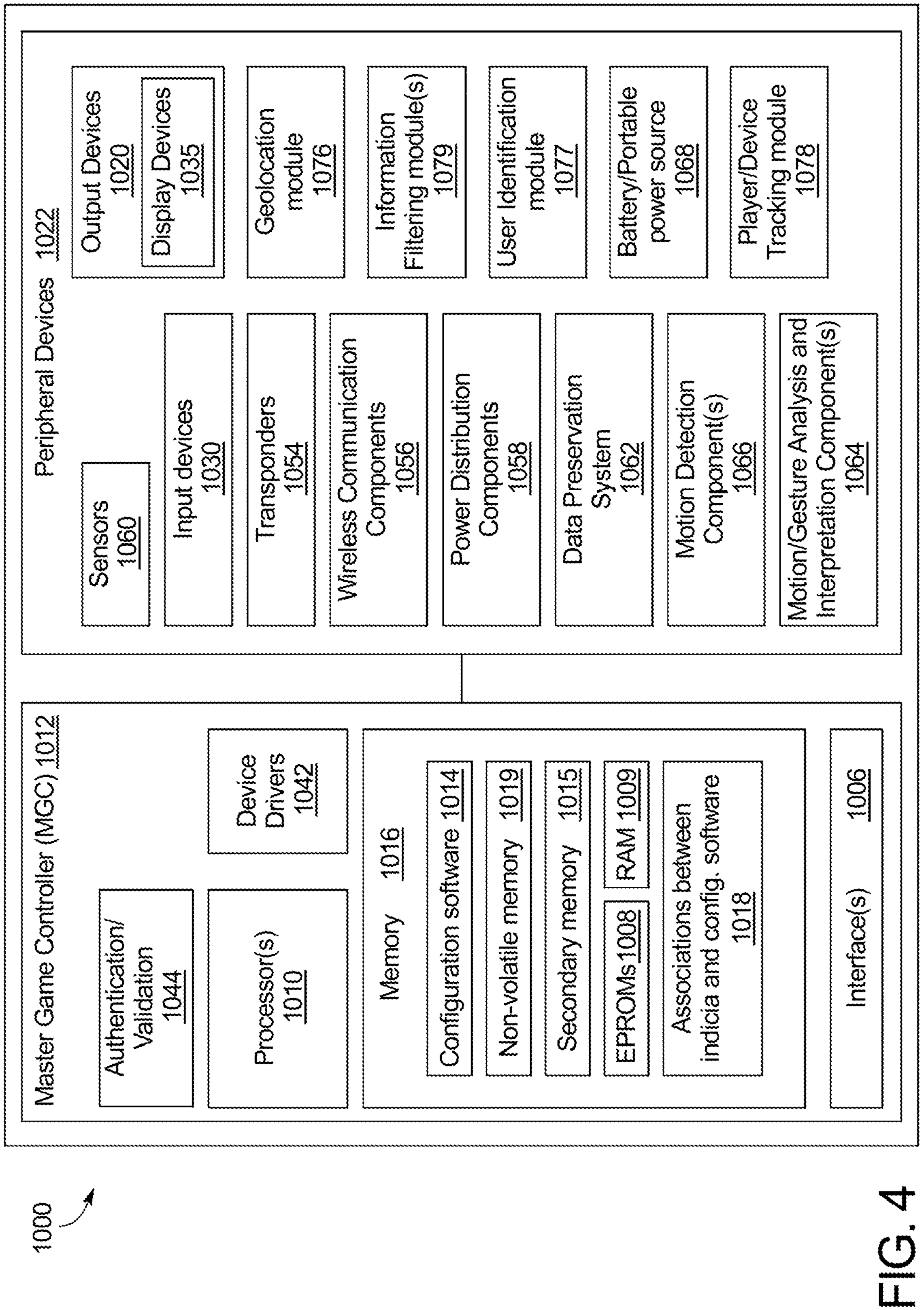
FIG. 4 is a schematic block diagram of one embodiment of an electronic configuration of an example electronic gaming machine of the present disclosure.
Figure 5A:
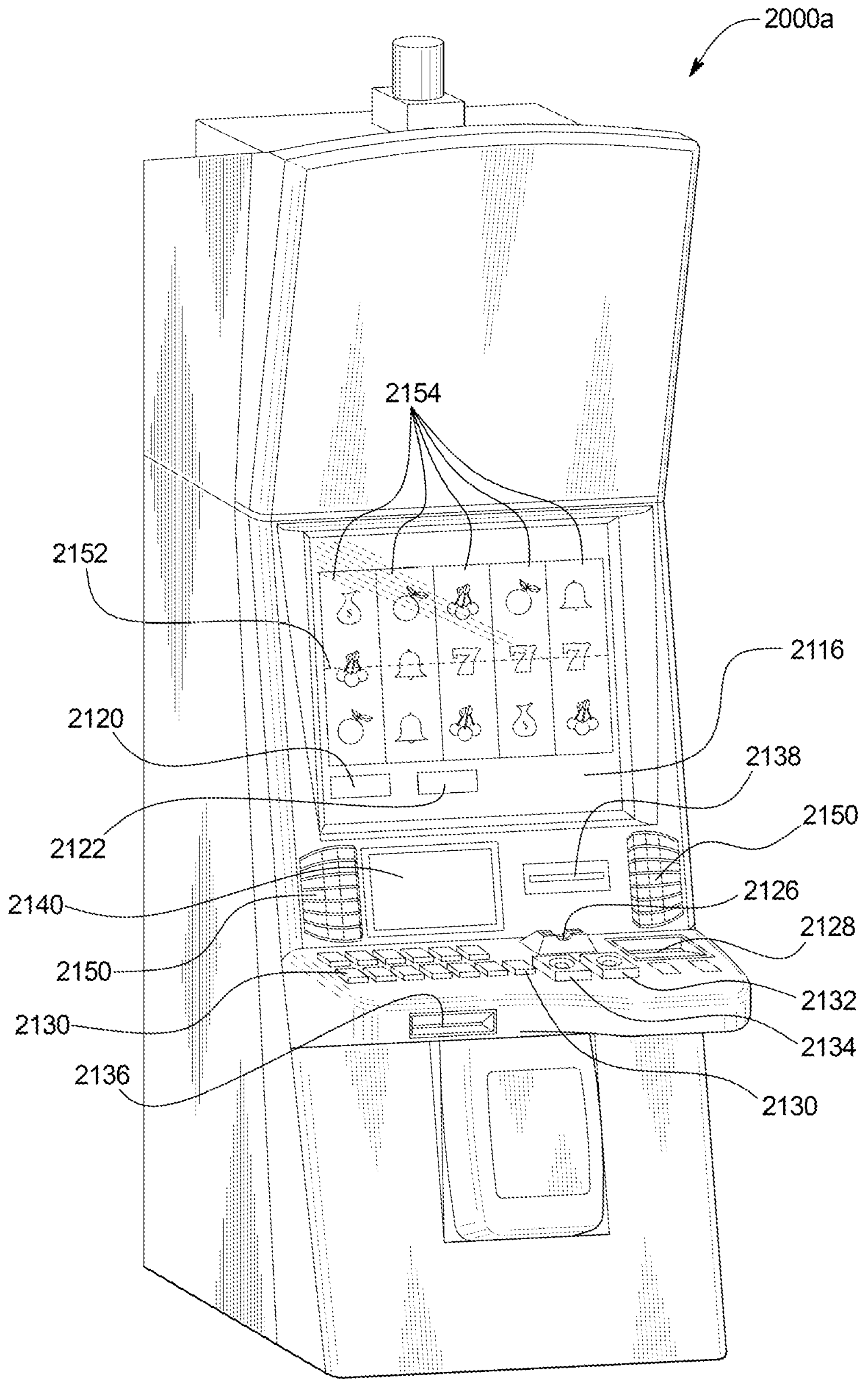
FIGS. 5A and 5B are perspective views of example alternative embodiments of an electronic gaming machine of the present disclosure.
Figure 5B:
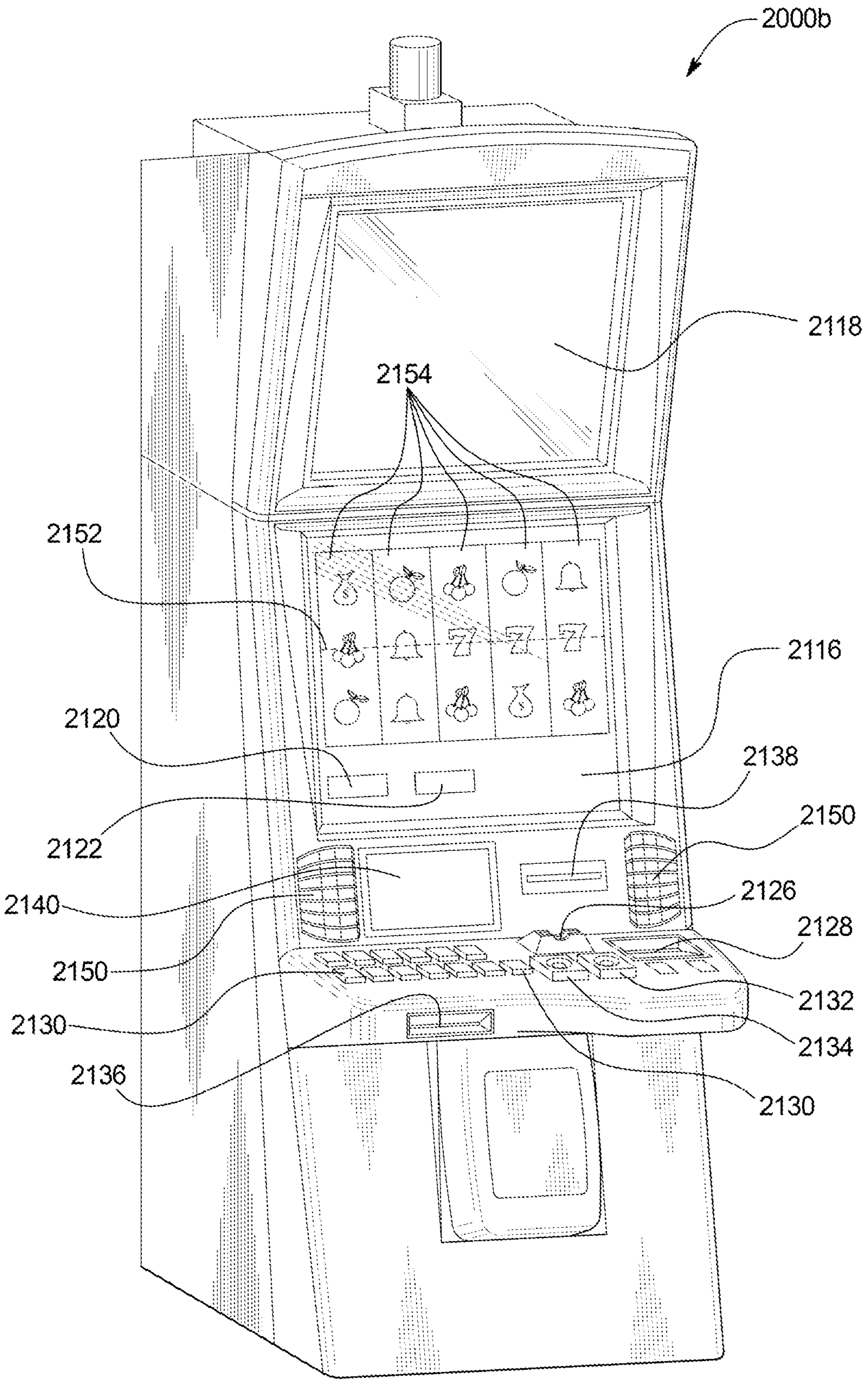
Figure 5C:
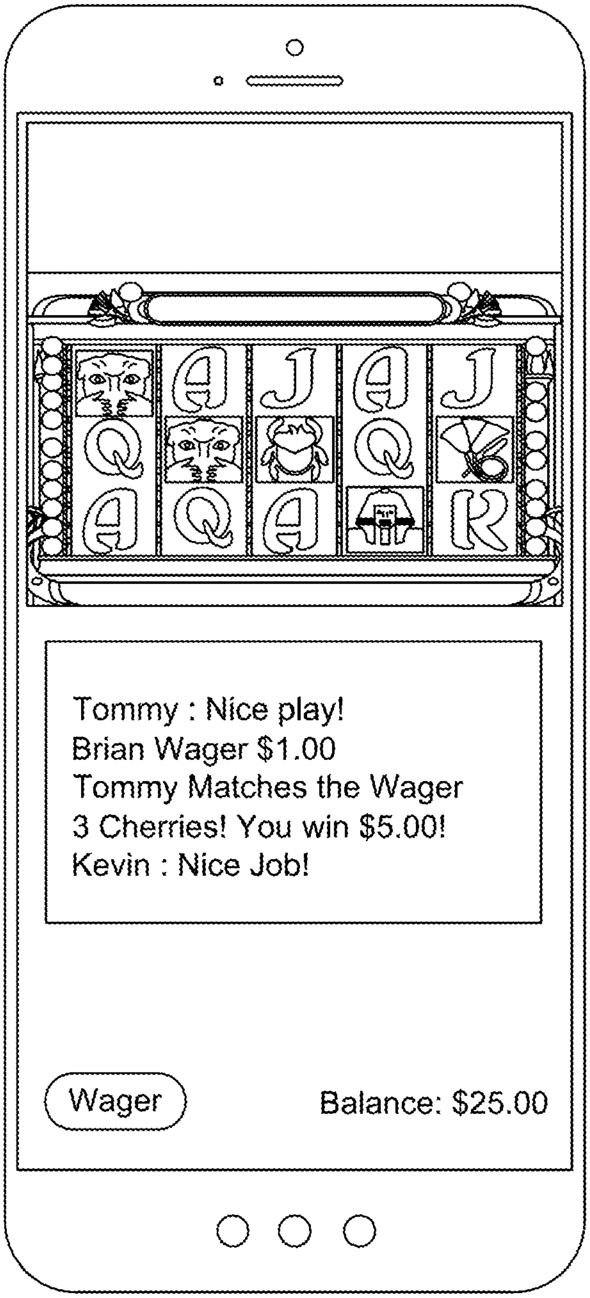
FIG. 5C is a front view of an example personal gaming device of the present disclosure.

FIG. 4 is a block diagram of an example streaming device and/or client device 1000 and FIGS. 5A and 5B include two different example streaming devices and/or client devices 2000*a* and 2000*b*. The streaming devices and/or client devices 1000, 2000*a*, and 2000*b* are merely example streaming devices and/or client devices, and different streaming devices and/or client devices may be implemented using different combinations of the components shown in the streaming devices and/or the client devices 1000, 2000*a*, and 2000*b*. Although the below refers to streaming devices and/or client devices, in various embodiments personal gaming devices (such as personal gaming device 2000*c* of FIG. 5C) may include some or all of the below components.

In these embodiments, the streaming device and/or the client device 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the streaming device and/or the client device; (3) accessing memory to configure or reconfigure game parameters in the memory according to indicia read from the streaming device and/or the client device; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the streaming device and/or the client device (described below), while in other embodiments at least one component of the master gaming controller 1012 resides outside of the housing of the streaming device and/or the client device.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the streaming device and/or the client device of the present disclosure. In certain embodiments, the at least one memory device 1016 resides within the housing of the streaming device and/or the client device (described below), while in other embodiments at least one component of the at least one memory device 1016 resides outside of the housing of the streaming device and/or the client device.

The at least one memory device 1016 is configured to store, for example: (1) configuration software 1014, such as all the parameters and settings for a game playable on the streaming device and/or the client device; (2) associations 1018 between configuration indicia read from a streaming device and/or a client device with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the streaming device and/or the client device to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the streaming device and/or the client device to control the streaming device and/or the client device. The at least one memory device 1016 of the streaming device and/or the client device also stores other operating data, such as image data, event data, input data, random number generators (RNGs) or pseudo-RNGs, paytable data or information, and/or applicable game rules that relate to the play of one or more games on the streaming device and/or the client device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a streaming device and/or a client device to implement at least part of the present disclosure. In other embodiments, part or all of the program code and/or the operating data is downloaded to the at least one memory device of the streaming device and/or the client device through any suitable data network described above (such as an internet or intranet).

The at least one memory device 1016 also stores a plurality of device drivers 1042. Examples of different types of device drivers include device drivers for streaming device and/or client device components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the streaming device and/or the client device. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the streaming device and/or the client device loads the new device driver from the at least one memory device to enable communication with the new device. For instance, one type of card reader in the streaming device and/or the client device can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified streaming device and/or client device components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one user/device tracking module 1078; and (14) at least one information filtering module 1079.

The at least one output device 1020 includes at least one display device 1035 configured to display any game(s) displayed by the streaming device and/or the client device and any suitable information associated with such game(s). In certain embodiments, the display devices are connected to or mounted on a housing of the streaming device and/or the client device (described below). In various embodiments, the display devices serve as digital glass configured to advertise certain games or other aspects of the gaming establishment in which the streaming device and/or the client device is located. In various embodiments, the streaming device and/or the client device includes one or more of the following display devices: (a) a central display device; (b) a player tracking display configured to display various information regarding a user's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example streaming device and/or client device 2000*a* illustrated in FIG. 5A includes a central display device 2116, a player tracking display 2140, a credit display 2120, and a bet display 2122. The example streaming device and/or client device 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the streaming device and/or the client device are configured to display one or more game and/or non-game images, symbols, and indicia. In certain embodiments, the display devices of the streaming device and/or the client device are configured to display any suitable visual representation or exhibition of the movement of objects; dynamic lighting; video images; images of people, characters, places, things, and faces of cards; and the like. In certain embodiments, the display devices of the streaming device and/or the client device are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the streaming device and/or the client device receives an actuation of a cashout device (described below), the streaming device and/or the client device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example streaming devices and/or client devices 2000*a* and 2000*b* illustrated in FIGS. 5A and 5B each include a ticket printer and dispenser 2136.

In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user. While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the streaming device and/or the client device, such as an attract mode. The example streaming devices and/or client devices 2000*a* and 2000*b* illustrated in FIGS. 5A and 5B each include a plurality of speakers 2150. In another such embodiment, the streaming device and/or the client device provides dynamic sounds coupled with attractive multimedia images displayed on one or more of the display devices to provide an audio-visual representation or to otherwise display full-motion video with sound to attract users to the streaming device and/or the client device. In certain embodiments, the streaming device and/or the client device displays a sequence of audio and/or visual attraction messages during idle periods to attract potential users to the streaming device and/or the client device. The videos may be customized to provide any appropriate information.

The at least one input device 1030 may include any suitable device that enables an input signal to be produced and received by the at least one processor 1010 of the streaming device and/or the client device.

In one embodiment, the at least one input device 1030 includes a payment device configured to communicate with the at least one processor of the streaming device and/or the client device to fund the streaming device and/or the client device. In certain embodiments, the payment device includes one or more of: (a) a bill acceptor into which paper money is inserted to fund the streaming device and/or the client device; (b) a ticket acceptor into which a ticket or a voucher is inserted to fund the streaming device and/or the client device; (c) a coin slot into which coins or tokens are inserted to fund the streaming device and/or the client device; (d) a reader or a validator for credit cards, debit cards, or credit slips into which a credit card, debit card, or credit slip is inserted to fund the streaming device and/or the client device; (e) a user identification card reader into which a user identification card is inserted to fund the streaming device and/or the client device; or (f) any suitable combination thereof. The example streaming devices and/or client devices 2000*a* and 2000*b* illustrated in FIGS. 5A and 5B each include a combined bill and ticket acceptor 2128 and a coin slot 2126.

In one embodiment, the at least one input device 1030 includes a payment device configured to enable the streaming device and/or the client device to be funded via an electronic funds transfer, such as a transfer of funds from a bank account. In another embodiment, the streaming device and/or the client device includes a payment device configured to communicate with a mobile device of a user, such as a mobile phone, a radio frequency identification tag, or any other suitable wired or wireless device, to retrieve relevant information associated with that user to fund the streaming device and/or the client device. When the streaming device and/or the client device is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). One such wagering or betting device is as a maximum wager or bet device that, when actuated, causes the streaming device and/or the client device to place a maximum wager on a play of a game. Another such wagering or betting device is a repeat bet device that, when actuated, causes the streaming device and/or the client device to place a wager that is equal to the previously-placed wager on a play of a game. A further such wagering or betting device is a bet one device that, when actuated, causes the streaming device and/or the client device to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). After a user appropriately funds the streaming device and/or the client device and places a wager, the streaming device and/or the client device activates the game play activation device to enable the user to actuate the game play activation device to initiate a play of a game on the streaming device and/or the client device (or another suitable sequence of events associated with the streaming device and/or the client device). After the streaming device and/or the client device receives an actuation of the game play activation device, the streaming device and/or the client device initiates the play of the game. The example streaming devices and/or client devices 2000*a* and 2000*b* illustrated in FIGS. 5A and 5B each include a game play activation device in the form of a game play initiation button 2132. In other embodiments, the streaming device and/or the client device begins game play automatically upon appropriate funding rather than upon utilization of the game play activation device.

In other embodiments, the at least one input device 1030 includes a cashout device. In various embodiments, the cashout device is: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). When the streaming device and/or the client device receives an actuation of the cashout device from a user and the user has a positive (i.e., greater-than-zero) credit balance, the streaming device and/or the client device initiates a payout associated with the user's credit balance. The example streaming devices and/or client devices 2000*a* and 2000*b* illustrated in FIGS. 5A and 5B each include a cashout device in the form of a cashout button 2134.

In various embodiments, the at least one input device 1030 includes a plurality of buttons that are programmable by the streaming device and/or the client device operator to, when actuated, cause the streaming device and/or the client device to perform particular functions. For instance, such buttons may be hard keys, programmable soft keys, or icons icon displayed on a display device of the streaming device and/or the client device (described below) that are actuatable via a touch screen of the streaming device and/or the client device (described below) or via use of a suitable input device of the streaming device and/or the client device (such as a mouse or a joystick). The example streaming devices and/or client devices 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the streaming device and/or the client device by touching the touch screen at the appropriate locations.

In embodiments including a player tracking system, as further described below, the at least one input device 1030 includes a card reader in communication with the at least one processor of the streaming device and/or the client device. The example streaming devices and/or client devices 2000*a* and 2000*b* illustrated in FIGS. 5A and 5B each include a card reader 2138. The card reader is configured to read a user identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the streaming device and/or the client device. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the streaming device and/or the client device, such as one or more rechargeable power sources (e.g., rechargeable batteries) located at the streaming device and/or the client device.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the streaming device and/or the client device; detecting the presence and/or identity of various persons (e.g., users, casino employees, etc.), devices (e.g., user input devices), and/or systems within a predetermined proximity to the streaming device and/or the client device.

The at least one data preservation component 1062 is configured to detect or sense one or more events and/or conditions that, for example, may result in damage to the streaming device and/or the client device and/or that may result in loss of information associated with the streaming device and/or the client device. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected user movements and/or gestures to determine appropriate user input information relating to the detected user movements and/or gestures. For example, in one embodiment, the at least one motion/gesture analysis and interpretation component 1064 is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source 1068 enables the streaming device and/or the client device to operate in a mobile environment. For example, in one embodiment, the streaming device and/or the client device includes one or more rechargeable batteries.

The at least one geolocation module 1076 is configured to acquire geolocation information from one or more remote sources and use the acquired geolocation information to determine information relating to a relative and/or absolute position of the streaming device and/or the client device. For example, in one implementation, the at least one geolocation module 1076 is configured to receive GPS signal information for use in determining the position or location of the streaming device and/or the client device. In another implementation, the at least one geolocation module 1076 is configured to receive multiple wireless signals from multiple remote devices (e.g., streaming devices and/or client devices, servers, wireless access points, etc.) and use the signal information to compute position/location information relating to the position or location of the streaming device and/or the client device.

The at least one user identification module 1077 is configured to determine the identity of the current user or current owner of the streaming device and/or the client device. For example, in one embodiment, the current user is required to perform a login process at the streaming device and/or the client device in order to access one or more features. Alternatively, the streaming device and/or the client device is configured to automatically determine the identity of the current user based on one or more external signals, such as an RFID tag or badge worn by the current user and that provides a wireless signal to the streaming device and/or the client device that is used to determine the identity of the current user. In at least one embodiment, various security features are incorporated into the streaming device and/or the client device to prevent unauthorized users from accessing confidential or sensitive information.

The at least one information filtering module 1079 is configured to perform filtering (e.g., based on specified criteria) of selected information to be displayed at one or more displays 1035 of the streaming device and/or the client device.

In various embodiments, the streaming device and/or the client device includes a plurality of communication ports configured to enable the at least one processor of the streaming device and/or the client device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example streaming devices and/or client devices 2000*a* and 2000*b* illustrated in FIGS. 5A and 5B, the streaming device and/or the client device has a support structure, housing, or cabinet that provides support for a plurality of the input devices and the output devices of the streaming device and/or the client device. Further, the streaming device and/or the client device is configured such that a user may operate it while standing or sitting. In various embodiments, the streaming device and/or the client device is positioned on a base or stand, or is configured as a pub-style tabletop game (not shown) that a user may operate typically while sitting. As illustrated by the different example streaming devices and/or client devices 2000*a* and 2000*b* shown in FIGS. 5A and 5B, streaming devices and/or client devices may have varying housing and display configurations.

In certain embodiments, the streaming device and/or the client device is a device that has obtained approval from a regulatory gaming commission, and in other embodiments, the streaming device and/or the client device is a device that has not obtained approval from a regulatory gaming commission.

The streaming devices and/or client devices described above are merely three examples of different types of streaming devices and/or client devices. Certain of these example streaming devices and/or client devices may include one or more elements that may not be included in all systems, and these example streaming devices and/or client devices may not include one or more elements that are included in other systems. For example, certain streaming devices and/or client devices include a coin acceptor while others do not.

In various embodiments, a streaming device and/or a client device may be implemented in one of a variety of different configurations. In various embodiments, the streaming device and/or the client device may be implemented as one of: (a) a dedicated streaming device and/or client device in which computerized game programs executable by the streaming device and/or the client device for controlling any primary or base games (referred to herein as "primary games") and/or any secondary or bonus games or other functions (referred to herein as "secondary games") displayed by the streaming device and/or the client device are provided with the streaming device and/or the client device before delivery to a gaming establishment or before being provided to a user; and (b) a changeable streaming device and/or client device in which computerized game programs executable by the streaming device and/or the client device for controlling any primary games and/or secondary games displayed by the streaming device and/or the client device are downloadable or otherwise transferred to the streaming device and/or the client device through a data network or remote communication link; from a USB drive, flash memory card, or other suitable memory device; or in any other suitable manner after the streaming device and/or the client device is physically located in a gaming establishment or after the streaming device and/or the client device is provided to a user.

As generally explained above, in various embodiments in which the system includes a server and a changeable streaming device and/or client device, the at least one memory device of the server stores different game programs and instructions executable by the at least one processor of the changeable streaming device and/or client device to control one or more primary games and/or secondary games displayed by the changeable streaming device and/or client device. More specifically, each such executable game program represents a different game or a different type of game that the at least one changeable streaming device and/or client device is configured to operate. In one example, certain of the game programs are executable by the changeable streaming device and/or client device to operate games having the same or substantially the same game play but different paytables. In different embodiments, each executable game program is associated with a primary game, a secondary game, or both. In certain embodiments, an executable game program is executable by the at least one processor of the at least one changeable streaming device and/or client device as a secondary game to be played simultaneously with a play of a primary game (which may be downloaded to or otherwise stored on the at least one changeable streaming device and/or client device), or vice versa.

In operation of such embodiments, the server is configured to communicate one or more of the stored executable game programs to the at least one processor of the changeable streaming device and/or client device. In different embodiments, a stored executable game program is communicated or delivered to the at least one processor of the changeable streaming device and/or client device by: (a) embedding the executable game program in a device or a component (such as a microchip to be inserted into the changeable streaming device and/or client device); (b) writing the executable game program onto a disc or other media; or (c) uploading or streaming the executable game program over a data network (such as a dedicated data network). After the executable game program is communicated from the server to the changeable streaming device and/or client device, the at least one processor of the changeable streaming device and/or client device executes the executable game program to enable the primary game and/or the secondary game associated with that executable game program to be played using the display device(s) and/or the input device(s) of the changeable streaming device and/or client device. That is, when an executable game program is communicated to the at least one processor of the changeable streaming device and/or client device, the at least one processor of the changeable streaming device and/or client device changes the game or the type of game that may be played using the changeable streaming device and/or client device.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the system includes a server and a streaming device and/or a client device, the streaming device and/or the client device is configured to communicate with the server for monitoring purposes only. In such embodiments, the streaming device and/or the client device determines the game outcome(s) and/or award(s) to be provided in any of the manners described above, and the server monitors the activities and events occurring on the streaming device and/or the client device. In one such embodiment, the system includes a real-time or online accounting and gaming information system configured to communicate with the server. In this embodiment, the accounting and gaming information system includes: (a) a user database configured to store user profiles, (b) a player tracking module configured to track users (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example streaming device and/or client device 2000*b* shown in FIG. 5B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement. In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of user excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game. In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game. In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game. In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of streaming devices and/or client devices, the streaming devices and/or the client devices are configured to communicate with one another to provide a group gaming environment. In certain such embodiments, the streaming devices and/or the client devices enable users of those streaming devices and/or client devices to work in conjunction with one another, such as by enabling the users to play together as a team or group, to win one or more awards. In other such embodiments, the streaming devices and/or the client devices enable users of those streaming devices and/or client devices to compete against one another for one or more awards. In one such embodiment, the streaming devices and/or the client devices enable the users of those streaming devices and/or client devices to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a user's gaming activity. In one such embodiment, the player tracking system does so through the use of player tracking cards. In this embodiment, a user is issued a user identification card that has an encoded user identification number that uniquely identifies the user. When the user's playing tracking card is inserted into a card reader of the system to begin a gaming session, the card reader reads the user identification number off the player tracking card to identify the user. The system timely tracks any suitable information or data relating to the identified user's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more users, the player tracking system includes the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device-such as a smartphone, a tablet computer, a desktop computer, or a laptop computer—to enable web-based game play using the personal gaming device. In various embodiments, the user must first access a gaming website via an internet browser of the personal gaming device or execute an application (commonly called an "app") installed on the personal gaming device before the user can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the user before enabling game play on the personal gaming device (or, in some embodiments, before enabling monetary wager-based game play on the personal gaming device). In these embodiments, the user must identify herself to the one or more servers, such as by inputting the user's unique username and password combination (or in any other manners described above.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer or by initiating creation of a paper check that is mailed to the user.

In certain embodiments, the one or more servers include a payment server that handles establishing and cashing out users' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal gaming device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic arca.

In various embodiments, the system includes a streaming device and/or a client device configured to communicate with a personal gaming device-such as a smartphone, a tablet computer, a desktop computer, or a laptop computer—to enable tethered mobile game play using the personal gaming device. Generally, in these embodiments, the streaming device and/or the client device establishes communication with the personal gaming device and enables the user to play games on the streaming device and/or the client device remotely via the personal gaming device. In certain embodiments, the system includes a geo-fence system that enables tethered game play within a particular geographic area but not outside of that geographic arca.

In certain embodiments, the system is configured to communicate with a social network server that hosts or partially hosts a social networking website via a data network (such as the internet) to integrate a user's gaming experience with the user's social networking account. This enables the system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the system to receive certain information from the social network server, such as the user's likes or dislikes or the user's list of connections. In certain embodiments, the system enables the user to link the user's user account to the user's social networking account(s). This enables the system to, once it identifies the user and initiates a gaming session (such as via the user logging in to a website (or an application) on the user's personal gaming device or via the user inserting the user's player tracking card into a streaming device and/or a client device), link that gaming session to the user's social networking account(s). In other embodiments, the system enables the user to link the user's social networking account(s) to individual gaming sessions when desired by providing the required login information.

For instance, in one embodiment, if a user wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the system enables the user to recommend a game to the user's connections by posting a recommendation to the user's wall (or other suitable area) of the social networking website.

Certain of the devices or components of the present disclosure, such as streaming devices and/or client devices located in a casino or another gaming establishment, include certain components and/or are configured to operate in certain manners that differentiate these systems from general purpose computing devices.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the user, the EGM stores the pre-power failure state in a non-volatile memory, returns to that state upon restoration of power, and provides the award to the user. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a user of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the user's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/see (Read) and/or at least 38.0 Mbytes/see (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A live streaming platform server comprising:

a processor; and a memory device that stores a plurality of instructions that, when executed by the processor, cause the processor to:

receive, from a streaming device, data associated with a play of a wagering game displayed at the streaming device, communicate, to a client device and at least partially based on the data communicated from the streaming device, a live stream comprising at least the play of the wagering game displayed at the streaming device, determine if any data associated with any wager being placed on the play of the wagering game is received from the client device, responsive to the determination being that data associated with a wager placed on the play of the wagering game is received from the client device, utilize memory storage resources by causing data associated with the client device wagering on the play of the wagering game to be stored for future access, and responsive to the determination being that no data associated with any wager being placed on the play of the wagering game is received from the client device, bypass utilizing any memory storage resources to store data associated with the client device displaying the play of the wagering game by causing no data associated with the client device displaying the play of the wagering game to be stored.

2. The live streaming platform server of claim 1, wherein the data associated with the client device wagering on the play of the wagering game is stored by the memory device.

3. The live streaming platform server of claim 1, wherein the data associated with the client device wagering on the play of the wagering game comprises at least one of data associated with the wager placed from the client device and data associated with any award won at the client device on the play of the wagering game.

4. The live streaming platform server of claim 1, wherein the data associated with the client device wagering on the play of the wagering game comprises a video of at least part of the play of the wagering game.

5. The live streaming platform server of claim 4, wherein the video comprises at least one of a video of the play of the wagering game displayed in association with the streaming device and a video of the play of the wagering game displayed by the client device.

6. The live streaming platform server of claim 4, wherein the video is stored in association with at least one of a reduced quality, a reduced frame rate, a modified compression setting, and a reduced storage timeframe.

7. The live streaming platform server of claim 1, wherein the streaming device comprises any of an electronic gaming machine and a slot machine interface board.

8. The live streaming platform server of claim 1, wherein the client device comprises any of an electronic gaming machine, a slot machine interface board, and a personal gaming device.

9. A live streaming platform server comprising:

a processor; and a memory device that stores a plurality of instructions that, when executed by the processor, cause the processor to:

receive, from a streaming device, data associated with a play of a wagering game displayed at the streaming device, communicate, to a plurality of client devices and at least partially based on the data communicated from the streaming device, a live stream, determine if any data associated with any wager being placed on the play of the wagering game is received from any of the plurality of client devices, responsive to a receipt of data associated with a wager being placed on the play of the wagering game from a first client device of the plurality of client devices, utilize memory storage resources by causing data associated with the play of the wagering game displayed by the first client device to be stored for future access, and responsive to no data being received in association with any wager being placed on the play of the wagering game by a second, different client device of the plurality of client devices, bypass utilizing any memory storage resources to store data associated with the play of the wagering game displayed by the second, different client device by causing no data associated with the play of the wagering game displayed by the second, different client device to be stored.

10. The live streaming platform server of claim 9, wherein the data associated with the play of the wagering game displayed by the first client device comprises at least one of data associated with the wager placed from the first client device, data associated with any award won at the first client device on the play of the wagering game, a video of the play of the wagering game displayed in association with the streaming device and a video of the play of the wagering game displayed in by the first client device.

11. A method of operating a live streaming platform server, the method comprising:

receiving, from a streaming device, data associated with a play of a wagering game displayed at the streaming device, communicating, to a client device and at least partially based on the data communicated from the streaming device, a live stream comprising at least the play of the wagering game displayed at the streaming device, determining, by a processor, if any data associated with any wager being placed on the play of the wagering game is received from the client device, responsive to the determination being that data associated with a wager placed on the play of the wagering game is received from the client device, utilizing memory storage resources by causing, by the processor, data associated with the client device wagering on the play of the wagering game to be stored for future access, and responsive to the determination being that no data associated with any wager being placed on the play of the wagering game is received from the client device, bypassing utilizing any memory storage resources to store data associated with the client device displaying the play of the wagering game by causing no data associated with the client device displaying the play of the wagering game to be stored.

12. The method of claim 11, wherein the data associated with the client device wagering on the play of the wagering game is stored by the memory device.

13. The method of claim 11, wherein the data associated with the client device wagering on the play of the wagering game comprises at least one of data associated with the wager placed from the client device and data associated with any award won at the client device on the play of the wagering game.

14. The method of claim 11, wherein the data associated with the client device wagering on the play of the wagering game comprises a video of at least part of the play of the wagering game.

15. The method of claim 14, wherein the video comprises at least one of a video of the play of the wagering game displayed in association with the streaming device and a video of the play of the wagering game displayed by the client device.

16. The method of claim 14, wherein the video is stored in association with at least one of a reduced quality, a reduced frame rate, a modified compression setting, and a reduced storage timeframe.

17. The method of claim 11, wherein the streaming device comprises any of an electronic gaming machine and a slot machine interface board.

18. The method of claim 11, wherein the client device comprises any of an electronic gaming machine, a slot machine interface board, and a personal gaming device.

* * * * *